United States Patent [19]

Joyce et al.

[11] Patent Number: 5,341,495
[45] Date of Patent: Aug. 23, 1994

[54] BUS CONTROLLER HAVING STATE MACHINE FOR TRANSLATING COMMANDS AND CONTROLLING ACCESSES FROM SYSTEM BUS TO SYNCHRONOUS BUS HAVING DIFFERENT BUS PROTOCOLS

[75] Inventors: Thomas F. Joyce, Westford, Mass.; James W. Keeley, Nashua, N.H.; Richard A. Lemay, Carlisle, Mass.; Bruno DiPlacido, Jr., Dedham, Mass.; Martin M. Massucci, Burlington, Mass.

[73] Assignee: Bull HN Information Systems, Inc., Billerica, Mass.

[21] Appl. No.: 771,297

[22] Filed: Oct. 4, 1991

[51] Int. Cl.[5] ............... G06F 13/42; G06F 13/38; G06F 13/00
[52] U.S. Cl. ................. 395/500; 395/800; 395/325; 395/550; 364/926.91; 364/927.99; 364/950; 364/950.3; 364/977.5; 364/DIG. 2; 364/240; 364/271
[58] Field of Search ............... 395/800, 200, 325, 275, 395/500, 550

[56] References Cited

U.S. PATENT DOCUMENTS

| | | | |
|---|---|---|---|
| 4,205,373 | 5/1980 | Shah et al. | 395/425 |
| 4,974,150 | 11/1990 | Long et al. | 395/575 |
| 5,097,437 | 3/1992 | Larson | 395/775 |
| 5,125,088 | 6/1992 | Culley | 395/500 |
| 5,142,672 | 8/1992 | Johnson et al. | 395/500 |
| 5,142,682 | 8/1992 | Lemay et al. | 395/725 |
| 5,150,467 | 9/1992 | Hayes et al. | 395/325 |
| 5,220,651 | 6/1993 | Larson | 395/250 |
| 5,237,567 | 8/1993 | Nay et al. | 370/85.1 |
| 5,265,216 | 11/1993 | Murphy et al. | 395/325 |
| 5,278,974 | 1/1994 | Lemmon et al. | 395/550 |

Primary Examiner—Thomas C. Lee
Assistant Examiner—Paul Harrity
Attorney, Agent, or Firm—Faith F. Driscoll; John S. Solakian

[57] ABSTRACT

A processing unit tightly couples to a system bus which utilizes a split cycle bus protocol and includes a local memory which is accessible from such bus. The local memory couples to a high speed synchronous bus which operates according to a predetermined bus protocol. The processing unit includes a state machine which couples to the high speed synchronous bus and to the asynchronous system bus. The state machine emulates the predetermined bus synchronous protocol in transferring commands issued to the local memory from the system bus which uses the split cycle protocol.

15 Claims, 13 Drawing Sheets

MICROPROCESSOR BUS STATE MACHINE OVERVIEW

MSM STATE MACHINE OVERVIEW

XSM OVERVIEW

Fig. 7a₁

| COMMAND | start | STATE OF XSM Set A | | | | | |
|---|---|---|---|---|---|---|---|
| | | idle | a | b | c | d | e | f |
| Read EEPROM | wait for xsmstart | | s-eeprd r-first | | | | xsmask | r-hold r-boff |
| Write EEPROM | wait for xsmstart | | r-first | s-eepw | r-hold r-boff | | r-eepw xtclr | xsmstop |
| Write 2nd word of double odd | wait for xsmstart | ads,eads | r-first | xtrclr | | r-hold r-boff | xsmstop | (idle) |
| Write single/ double even | wait for xsmstart | ads,eads | r-first | xtrclr | | r-hold r-boff | xsmstop | (idle) |
| Write 1st word of double odd | wait for xsmstart | ads,eads | r-first | s-first r-hold r-boff | | xsmstop | (idle) | |
| Read 2nd burst | wait for xsmstart | ads | r-first | | | lrdw0 xsmask | lrdw1 | lrdw2 r-hold r-boff |
| Read 1st burst | wait for xsmstart | ads | r-first | s-first | | lrdw0 xsmask | lrdw1 | lrdw2 r-hold r-boff |
| Read 2nd word of double odd | wait for xsmstart | ads | r-first s-blast xsmask | | r-hold r-boff r-blast | lr(baddr) | xsmstall | |
| Read single/ double even | wait for xsmstart | ads | r-first s-blast xsmask | | r-hold r-boff r-blast | lr(baddr) | xsmstall | |
| Read 1st word of double odd | wait for xsmstart | ads | r-first s-blast | s-first | r-hold r-boff r-blast | l(baddr) xsmstop | (idle) | |
| Refresh | wait for xsmstart | ads refresh | r-refreq | r-hold r-boff | xsmstop | (idle) | | |

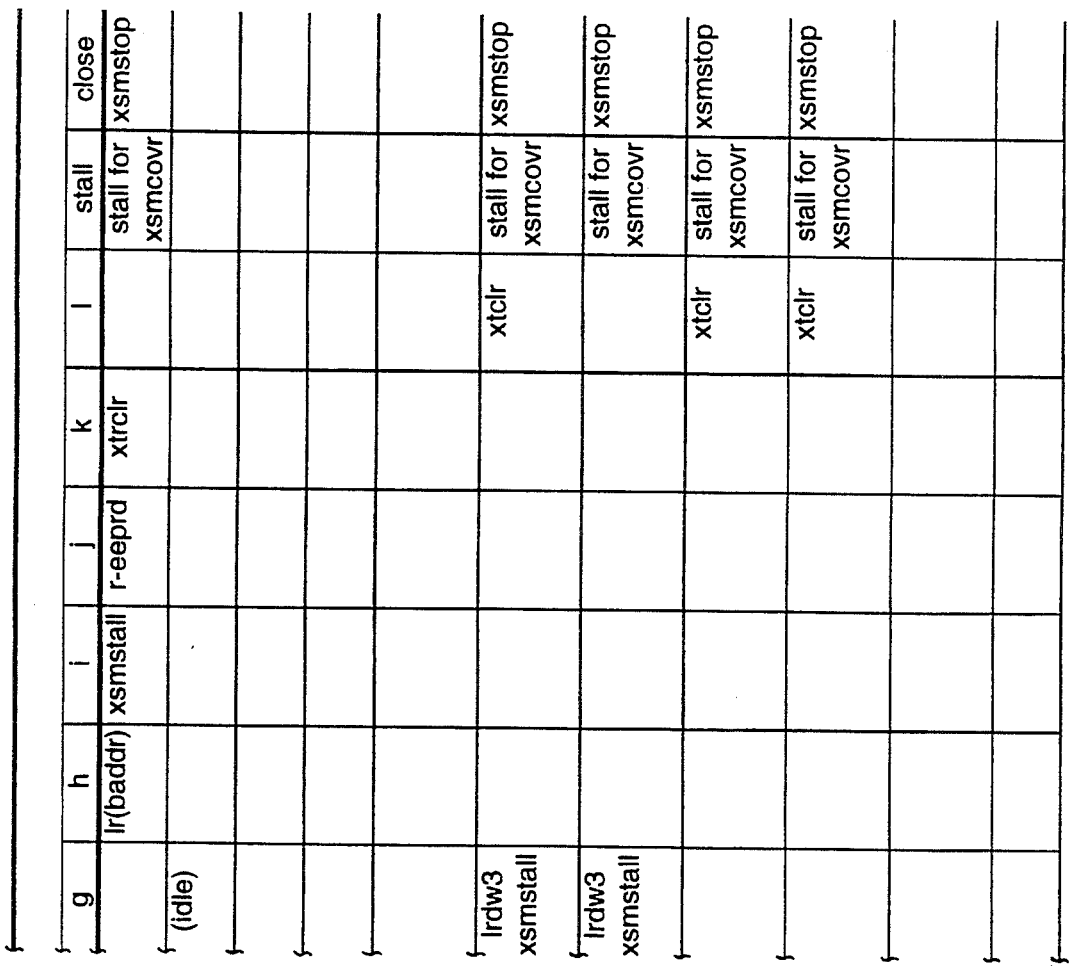
Fig. 7a₂

Fig. 7b₁

| COMMAND | | STATE OF XSM Set B | | | | | |
|---|---|---|---|---|---|---|---|
| | stall | start | a | b | c | d | e | f |
| Read EEPROM | waitwaiting for cycle o\ over - refreq | ads refresh | r-refreq | r-hold r-boff | xsmstall | | | |
| Write EEPROM | | | | | | | | |
| Write 2nd word of double odd | | | | | | | | |
| Write single/ double even | | | | | | | | |
| Write 1st word of double odd | | | | | | | | |
| Read 2nd burst | waitwaiting for cycle o\ over - refreq | ads refresh | r-refreq | r-hold r-boff | xsmstall | | | |
| Read 1st burst | waitwaiting for cycle o\ over - refreq | ads refresh | r-refreq | r-hold r-boff | xsmstall | | | |
| Read 2nd word of double odd | waitwaiting for cycle o\ over - refreq | ads refresh | r-refreq | r-hold r-boff | xsmstall | | | |
| Read single/ double even | waitwaiting for cycle o\ over - refreq | ads refresh | r-refreq | r-hold r-boff | xsmstall | | | |
| Read 1st word of double odd | | | | | | | | |
| Refresh | | | | | | | | |

| COMMAND | SYSTEM BUS PROTOCOL | | | | | | | | SYSTEM BUS ADDRESS | |
|---|---|---|---|---|---|---|---|---|---|---|
| | MREF | WRIT | LOCK | SHBC | DBWD | DBPL | BYTE | A...7 | 8......23 | |
| Read EEPROM | 0 | 0 | 0 | 0 | 0 | 0 | 0 | 0-----0 | 0000 0001 0010 1000 | |
| Write EEPROM | 0 | 1 | 0 | 0 | 0 | 0 | 0 | 0-----0 | 0000 0001 0010 1101 | |
| Write 2nd word of double odd | NO SYSTEM BUS CYCLE REQUIRED | | | | | | | | | |
| Write single/ double even | 1 | 1 | 0 | 0 | 1 | 0 | 0 | 1-----0 | 0000 0000 0000 0000 | |
| | 1 | 1 | 0 | 0 | 1 | 1 | 0 | 1-----0 | 0000 0000 0000 0000 | |
| Write 1st word of double odd | 1 | 1 | 0 | 0 | 1 | 1 | 0 | 1-----0 | 0000 0000 0000 0010 | |
| Read 2nd burst | NO SYSTEM BUS CYCLE REQUIRED | | | | | | | | | |
| Read 1st burst | 1 | 0 | 0 | 0 | 1 | 0 | 0 | 0-----0 | 0000 0000 0000 0000 | |
| Read 2nd word of double odd | NO SYSTEM BUS CYCLE REQUIRED | | | | | | | | | |
| Read single/ double even | 1 | 0 | 0 | 0 | 1 | 0 | 0 | 0-----0 | 0000 0000 0000 0000 | |
| | 1 | 0 | 0 | 0 | 1 | 1 | 0 | 0-----0 | | |
| Read 1st word of double odd | 1 | 0 | 0 | 0 | 1 | 1 | 0 | 0-----0 | 0000 0000 0000 0010 | |
| Refresh | NO SYSTEM BUS CYCLE REQUIRED | | | | | | | | | |

# BUS CONTROLLER HAVING STATE MACHINE FOR TRANSLATING COMMANDS AND CONTROLLING ACCESSES FROM SYSTEM BUS TO SYNCHRONOUS BUS HAVING DIFFERENT BUS PROTOCOLS

RELATED APPLICATIONS

1. The patent application of James W. Keeley and Thomas F. Joyce entitled, "High Performance Tightly Coupled Multiple Synchronous State Machine Based Processing Unit," filed on Oct. 4, 1991, bearing Ser. No. 07/771,289, still pending, which is assigned to the same assignee as this patent application.

2. The patent application of James W. Keeley entitled, "Bus Interface State Machines," filed on Oct. 4, 1991, bearing Ser. No. 07/771,712, still pending, which is assigned to the same assignee as this patent application.

3. The patent application of Thomas F. Joyce and James W. Keeley entitled, "Method and Apparatus for Avoiding Processor Deadly Embrace in a Multiprocessor System," filed on Oct. 4, 1991, bearing Ser. No. 07/771,296, now U.S. Pat. No. 5,283,870, which is assigned to the same assignee as this patent application.

BACKGROUND OF THE INVENTION

Field of Use

The present invention relates to data processing and, more particularly, to state machine apparatus.

Prior Art

It is well known to use ROM or PROM controlled state machines to produce control signals from previous state and instruction inputs. In the case of VLSI circuits, it has been a common practice to implement smaller finite state machines as single programmable logic array (PLA) finite state machines with delay latches used as state machines. These approaches lack the requisite speed and flexibility in assigning states.

One prior art unit which takes the form of a virtual memory unit (VMU) utilizes a state machine for defining sequential states used in generating control signals for sequencing the unit's operation. The state machine includes a plurality of programmable array logic (PAL) devices which are connected to gather status from the different parts of the unit. The outputs of the PAL devices connect to a state machine which has a plurality of storage locations, each of which stores a code defining a different machine state. The current state code provided by the state machine is distributed to other PAL devices within the unit. This unit is described in the copending patent application of Richard A. Lemay, et al. entitled, State Machine for Executing Commands Within a Minimum Number of Cycles by Accommodating Unforeseen Time Dependency According to Status Signals Received from Different Functional Sections, filed on Oct. 5, 1990, bearing Ser. No. 07/593,923 and assigned to the same assignee named herein.

While this approach provides greater flexibility and speed, it has been found that it cannot perform operations at rates which are comparable to that of current high performance microprocessors which operate at clock speed of up to 33 MHz. This becomes particularly important where a unit must operate in conjunction with such units without affecting the overall performance of a unit constructed to operate at such rates.

Accordingly, it is a primary object of the present invention to provide a programmable state machine which is highly programmable to be operated at different clock rates.

SUMMARY OF THE INVENTION

The above and other objects of the present invention are achieved in a preferred embodiment of a unit which includes a state machine which couples to a high speed synchronous bus which operates according to a predetermined bus protocol corresponding to that used by a high performance microprocessor. The state machine couples to the high speed synchronous bus and to a system bus which operates according to a split bus cycle protocol to provide high speed access to a memory unit which tightly couples to the synchronous bus.

According to the present invention, the state machine operates to emulate the operation of the predetermined bus protocol of the synchronous bus in transferring commands to the memory unit transferred by the system bus under the split cycle protocol. That is, it converts the normally complicated system bus protocol sequences into the required predetermined bus protocol sequences for receipt by the memory. Hence, the memory cannot tell the difference between the state machine and a high performance microprocessor if it were to be connected to the synchronous bus.

In the preferred embodiment, the state machine includes a plurality of PAL circuits which couple in series. A first PAL circuit decodes each system bus command and generates a multibit code designating the command type. The command type is applied to a second PAL circuit together with a state code generated by a state counter PAL circuit which sequences through a predetermined state in response to a number of start command. The states counter PAL circuit is preprogrammed with a number of precoded state sequences. Additionally, the second PAL circuit receives input signals representative of a number of predetermined events which could occur during the processing of the different types of system bus commands. In response to these groups of signals, the second PAL circuit generates signals for stopping or stalling the sequencing of the state counter PAL circuit.

The state code and command type code signals are applied to a number of PAL circuits, each of which is programmed for generating the required subcommand control signals for performing a particular class or type of operation.

The state machine arrangement of the present invention provides high speed operation and at low cost, since standard components can be used in its implementation. The need to evaluate few conditions during sequencing and simple interfaces between PAL circuits, in addition to other circuits within the unit further ensures high speed operation.

The above objects and advantages of the present invention will be better understood from the following description when taken in conjunction with the accompanying drawings.

FIGS. $7a_1$, $7a_2$, $6b_1$, $7b_2$, and $7c$ are diagrams used to explain the overall construction of the state machine of the present invention.

DETAILED DESCRIPTION OF THE PREFERRED EMBODIMENT

Figure 1:
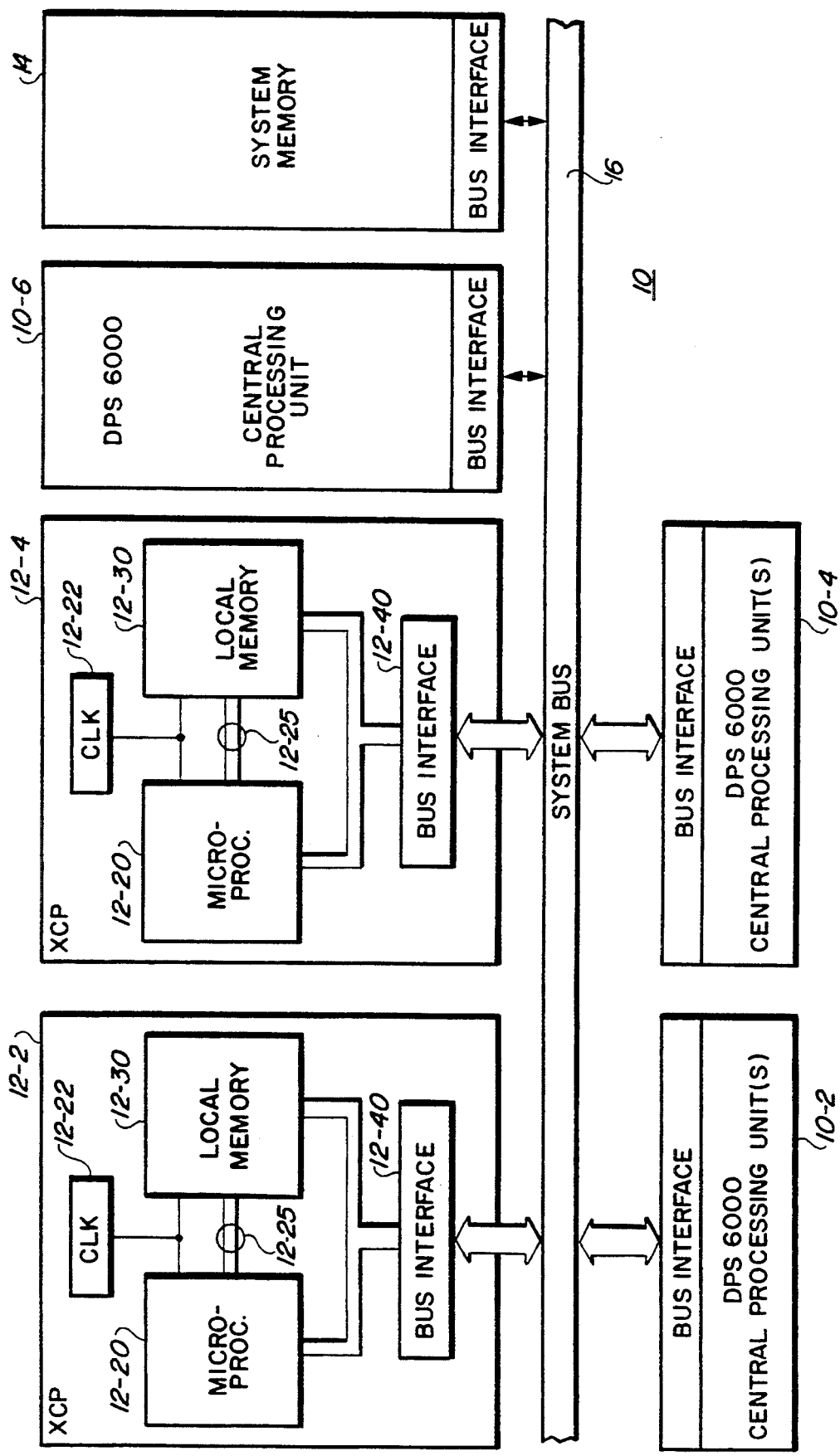
FIG. 1 is a block diagram of a multiprocessor system which includes a processor which includes the state machine of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40, as shown. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
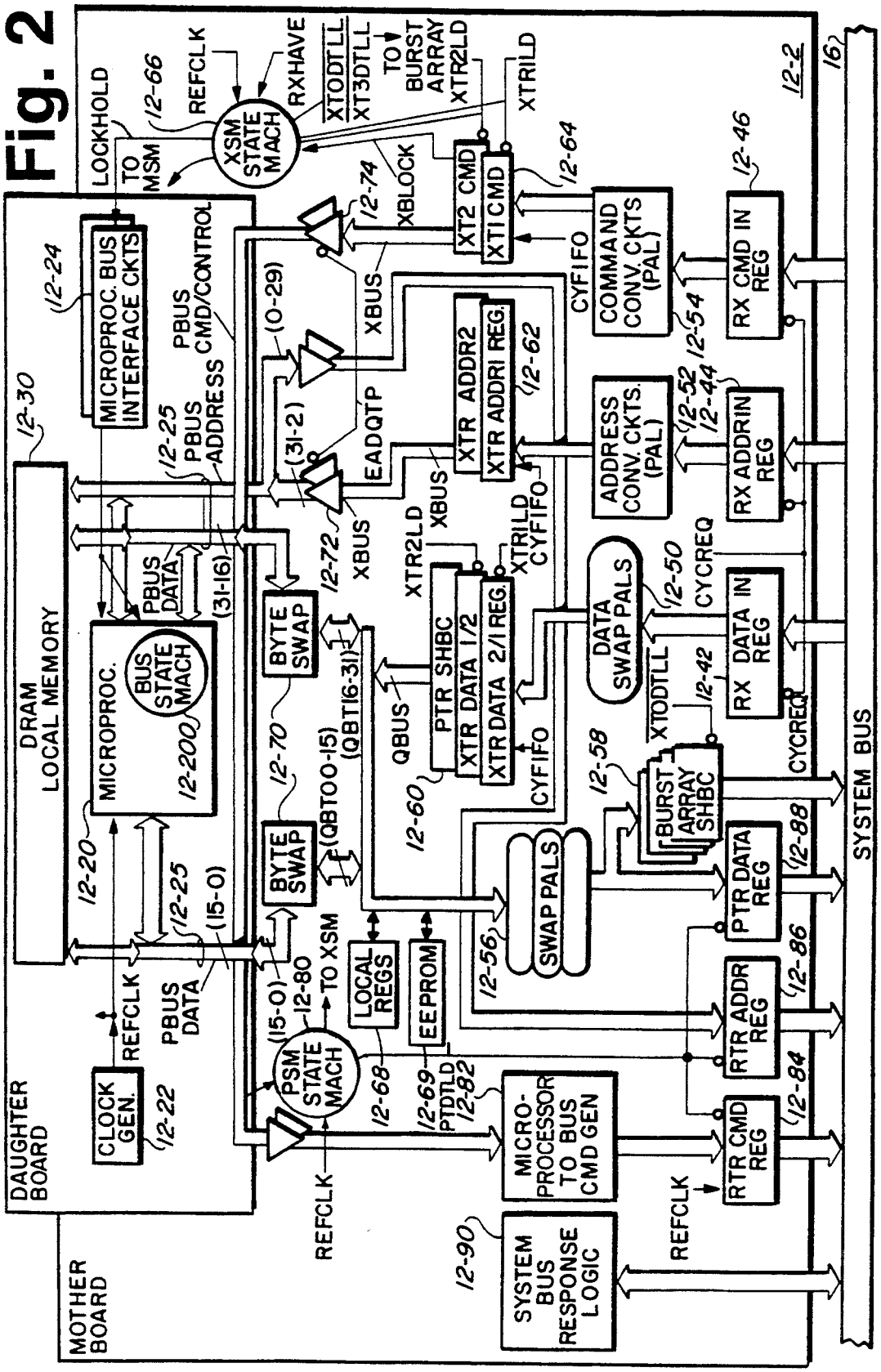
FIG. 2 shows in greater detail, one of the processors of FIG. 2 which incorporates the state machine.`

Description of FIG. 2

FIG. 2 shows in greater detail, the processor 12-2 of FIG. 1. In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The system and bus interface circuits 12-24, input and output registers and state machines 12-80 and 12-66 are contained on the mother board. These two boards make up the entire processor.

In greater detail, the microprocessor 12-2 and local memory 12-30 are tightly coupled to the address, data and command/control processor bus lines of local bus 12-25, as shown. The circuits of block 12-24 serve as interface circuits which apply control signals to the microprocessor's bus interface which couples internally to the bus state machine 12-200. State machine 12-200 is used to control the microprocessor's access to local bus 12-25 by the generation of the proper bus protocol as a function of control signals generated by external state machine (XSM) 12-66. As explained herein, the XSM 12-66 controls the accessing of local memory 12-30, in response to external requests received from system bus 16.

Additionally, the XSM 12-66 processes I/O requests received from system bus 16 for reading/writing the contents of an EEPROM array 12-69 which connects to the Q bus. To access the EEPROM array 12-69, a first I/O command containing a function code (FC) value of 29 is issued to load the EEPROM address register (EAR) from the bus data leads BSDT0-15 of system bus 16 via a receive bus, not shown. Next, a second I/O command is issued specifying a read or write (i.e., containing a function code (FC) value of 2D (write) or 28 (read) to the location specified by the previously loaded contents of the EAR register.

As shown, the external requests received from system bus 16 are loaded into the receive data, address and command registers 12-42 through 12-46, in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64. As shown, the registers of block 12-62 connect in common through tristate circuits to an output bus (X bus). The block 12-62 further includes a set of address registers which store incremented versions of the addresses stored in the queue registers which are used in conjunction with the read and write double word odd commands. Block 12-62 also includes control circuits for carrying out the required address incrementing. The Appendix sets forth the details of such circuits. Thereafter, the stored address and command signals are applied to the processor bus via the driver circuits of blocks 12-72 and 12-74, in response to an enabling signal EADQTP.

Any data associated with an external request loaded into register 12-42 is reordered as required by the programmable array logic (PALs) of block 12-50 and stored into the appropriate one of the registers of block 12-60 which connect in common to an output bus (Q bus) through tristate circuits. The different bytes of the data words are swapped from the so-called big endian format of the system bus to the little endian format utilized by microprocessor 12-20. This is accomplished by byte swap circuits of block 12-70 which is implemented by the proper reordering of connector pin connections.

The processor state machine (PSM) of block 12-80 controls the transfer and processing of transactions or requests initiated by microprocessor 12-20. As shown, commands generated by microprocessor 12-20 specifying an operation on system bus 16 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively, via an address bus and the Q data bus as shown in FIG. 2. This is all done in response to an enabling load signal PTDTLD generated by the PSM state machine 12-80 of control signals applied as an input to generator 12-82 and to the system bus response circuits of block 12-90. Additionally, the PSM 12-80 processes internal I/O requests initiated by microprocessor 12-20 for reading/writing different ones of a plurality of internal registers 12-68 connected to the Q bus.

Figure 3:
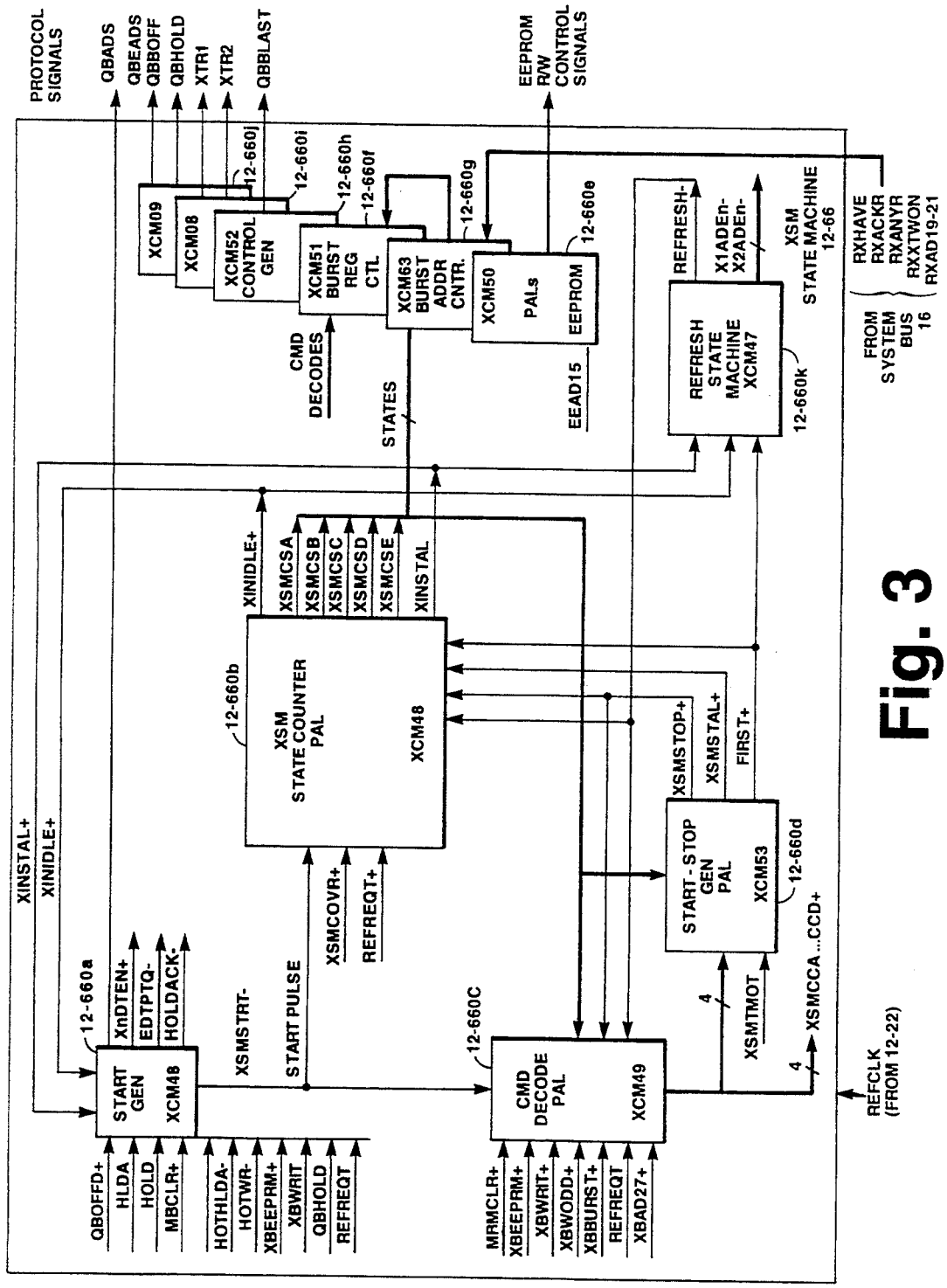
FIG. 3 shows in greater detail, the state machine of the present invention.

Description of FIG. 3

External State Machine (XSM) 12-66

FIG. 3 shows in greater detail, the external state machine (XSM) 12-66 of the present invention. The XSM 12-66 includes eleven clocked programmable array logic (PAL) circuits 12-660a through 12-660k, each of which receives clock signal REFCLK from clock generator 12-22. FIG. 3 shows in block diagram form, the external state machine (XSM) 12-66 of the present invention. The XSM 12-66 includes eleven clocked programmable array logic (PAL) circuits 12-660a through 12-660k.

PAL circuit 12-660a functions as an address strobe and start pulse generator. It receives as inputs, a processor bus hold acknowledge signal HOTHLDA−, a Q bus backoff delayed signal QBOFFD+, a processor bus read/write command signal HOTWR−, an external write signal XBWRIT, a system bus master clear signal MBCLR+, in addition to the internally generated idle and stall state signals XINDLE+ and XINSTAL+ from a state machine counter PAL circuit 12-660b.

PAL circuit 12-660a generates as outputs, Q bus address control signals QBADS and QBEADS, X data bus enable signals XIDTEN and X2DTEN, Q bus to processor data bus enable signal EDTPTQ− and start pulse signal XSMSTRT−. The start pulse signal is applied to the state machine counter PAL circuit 12-660b and to a command decode PAL circuit 12-660c.

The PAL circuit 12-660b receives as inputs, start signal XSMSTRT−, clock reference signal REFCLK+, cycle over signal XSMCOVR+, a refresh request signal REFREQT+, in addition to internally generated stop and stall signals XSMSTOP+ and XSMSTAL+, and refresh signal REFRESH− from a refresh state PAL circuit 12-660k. The PAL circuit 12-660b generates as outputs, idle and stall state signals XINIDLE+ and XINSTAL+, in addition to a plurality of state signals XSMCSA through XSMCSE which are used to generate further control signals for carrying out the requested operations as explained herein.

The PAL circuit 12-660c functions as a command decoder circuit. It receives as inputs, system bus master signal MBMCLR+, EEPROM command signal XBEEPRM+, write command signal XBWRIT+, odd word command signal XBWODD+, burst command signal XBBURST+, and system bus address command hit signal XBAD27+. It also receives internally generated start and stop signals XSMSTRT− and XSMSTOP+ from PAL circuits 12-660a and 12-660d, in addition to refresh signal REFRESH+ from PAL circuit 12-660k. The PAL circuit 12-660c generates as outputs, subcommand signals XSMCCA+ through XSMCCD which are used hinternally by PAL circuits 12-660d, 12-660e, 12-660f and 12-660k.

The PAL circuit 12-660d operates as a start-stop generator circuit which receives as inputs, system bus master clear signal MBMCLR, a bus time-out signal XSMTMOT+, in addition to the internally generated state signals XSMCSA+ through XSMCSE+ and subcommand signals XSMCCA+ through XSMCCD+. PAL circuit 12-660d generates as outputs, stall signal XSMSTAL+, stop signal XSMSTOP+ and first cycle signal FIRST+.

The PAL circuit 12-660e operates as the EEPROM read/write state generator. It receives as inputs, command address bit signal EEAD15+, in addition to the internally generated state signals XSMCSA through XSMCSE+ and subcommand signals XSMCCA+ through XSMCCD+. PAL circuit 12-660e generates as outputs, EEPROM read signals EEREAD-XT and internal and external EEPROM address register enable signals EARENB+ and EARENB−, in addition to EEPROM write enable signal WREPEU−.

The burst register controller and burst address PAL circuits 12-660f and 12-660g are used to control burst command operations. PAL circuit 12-660f receives as inputs, internally generated burst address command signals BURSTA1+ and BURSTA2 from burst counter PAL circuit 12-660f, in addition to internally generated state signals XSMCSA through XSMCSE+ and subcommand signals XSMCCA+ through XSMCCD+. The PAL circuit 12-660f generates as outputs, X bus burst register load and transfer signals XTODTLL− through XT3DTLL and XTODTLR− through XT3DTLR−− which are applied to the burst array registers of block 12-58.

The PAL circuit 12-660g receives as inputs, system bus receive signal RXHAVE, system bus acknowledgement signal RXACKR+, a system bus any request receive signal RXANYR+, request won signal RXXTWON+ and system bus receive address signals RXAD19+ through RXAD21+, in addition to internally generated X bus signals XTR1LD− and XTR2LD− and X1NEXT−. PAL circuit 12-660g produces as outputs, burst address signals BURSTA0+, BURSTA1 and BURSTA2+.

The PAL circuit 12-660h functions as a control generator circuit and provides certain bus protocol signals to local memory 12-30. PAL circuit 12-660k receives as inputs, system bus lock signal XBLOCK+, system bus second half bus cycle signal XBSHBC+, in addition to the internally generated state signals XSMCSA+ through XSMCSE+ and subcommand signals XSMCAA+ through XSMCCD+. The PAL circuit 12-660h generates as outputs, lock hold signal LOCKHOLD+ and bus protocol BLAST signal QBBLAST−, in addition to X bus clear signal XTRCLR+ which is applied to PAL circuit 12-660i, hold clear signal and refresh clear signal REFRCLR+.

The PAL circuit 12-660i functions as an X bus busy generator. It receives as inputs, system bus master clear signal MBMCLR+, system bus request received signal RXHAVE+, X bus busy indicator signals XTR1BSY+ and XTR2BSY+ from the system bus response circuits 12-90, a system bus memory acknowledge signal RXMEMA+, a system bus I/O read/write command acknowledge signal RXIORWA+ and a system bus EEPROM read/write command signal RXEERW+, in addition to internally generated X bus clear signal XTRCLR+. PAL circuit 12-660i generates as outputs, X register busy signals XTR1BSY+ and XTR2BSY which are applied as inputs to the system bus response circuits 12-90 and to PAL circuit 12-660j, an X bus next cycle signal X1NEXT and X bus register load signals XTR1LD— and XTR2LD.

The PAL circuit 12-660j functions as a backoff and hold generator and generates certain bus protocol signals. It receives as inputs, receive command signals RXHAVE+, RXIORWA+, and RXMEMA+, cycle over signal XSMCOVR+ from the system bus circuits, in addition to internally generated X bus busy signals XTR1BSY+, XTR2BSY+ from PAL circuit 12-660i and idle and stall state signals XNIDLE+ and XINSTAL+ from PAL circuit 12-660b. PAL circuit 12-660j generates as outputs, Q bus backoff signal QBBOFF— and Q bus hold signal QBHOLD+.

The PAL circuit 12-660k functions as a refresh state and X bus address register enables generator. It receives as inputs, refresh request signal REFREQT+, a backoff delayed signal QBOFFD, hold signal QBHOLD+, hold acknowledge signal HOTHLDA— and a cycle over signal XSMCOVR, in addition to internally generated signals FIRST+, X1NEXT+, XINIDLE+ and XINSTAL+. PAL circuit 12-660k generates as outputs, refresh signal REFRESH+ and X bus address register enable signals X1ADEN—, X1ADE0, X1ADE1, X2ADEN—, X2ADE0 and X2ADE1.

The equations for generating each of these signals by the XSM state machine 12-66 are set forth in the Appendix.

Figure 4:
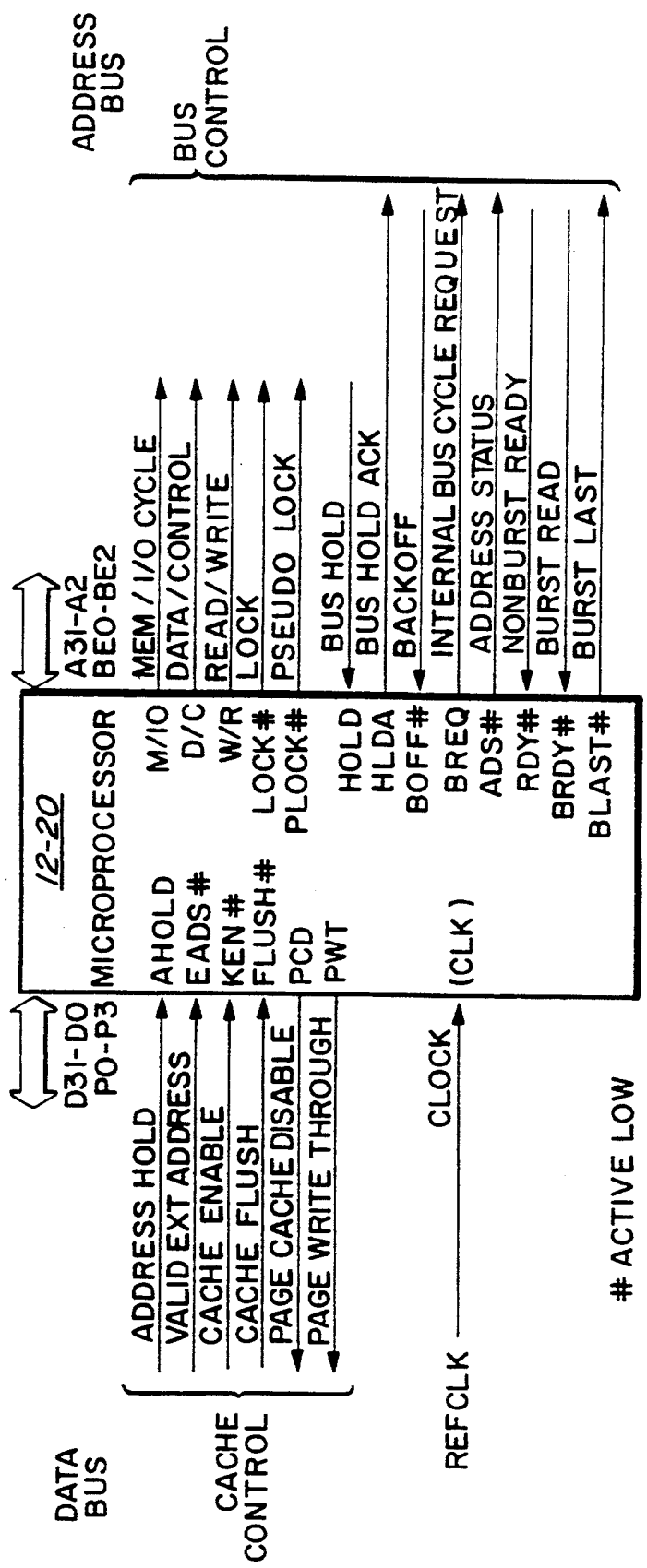
FIG. 4 shows in block form, the microprocessor of FIG. 2.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability. In greater detail, address lines A31–A2 are the address lines of microprocessor 12-20. Address lines A31–A2, together with the byte enables BE0–BE3, define the physical area of memory or I/O space being accessed. The byte enable lines BE0–BE3 indicate active bytes during read and write cycles. BE0 applies to data lines D0–D7. BE1 applies to data lines D8–D15. BE2 applies to data lines D16–D23. BE3 applies to data lines D24–D31.

The cache control section includes six pins for controlling the microprocessor's internal cache. The cache enable (KEN) input is most frequently used to disable areas of memory that cannot be cached.

The address hold (AHOLD) and external address strobe (EADS) inputs allow an external device to present the microprocessor 12-20 with an address. If the address matches an address in the microprocessor's internal cache, the associated data is flagged as invalid.

The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

For further information regarding the use of these signals, reference may be made to the Intel publication entitled, "i486 MICROPROCESSOR," dated November, 1989, Order Number: 240440-002.

DESCRIPTION OF OPERATION

With reference to FIGS. 1 through 4, the operation of the state machine of the present invention will now be described with reference to FIGS. 5a through 5d and FIG. 7. FIGS. 5a through 5d are state diagrams which illustrate the overall operations of the pertinent state machines of FIG. 2.

Figure 5A:
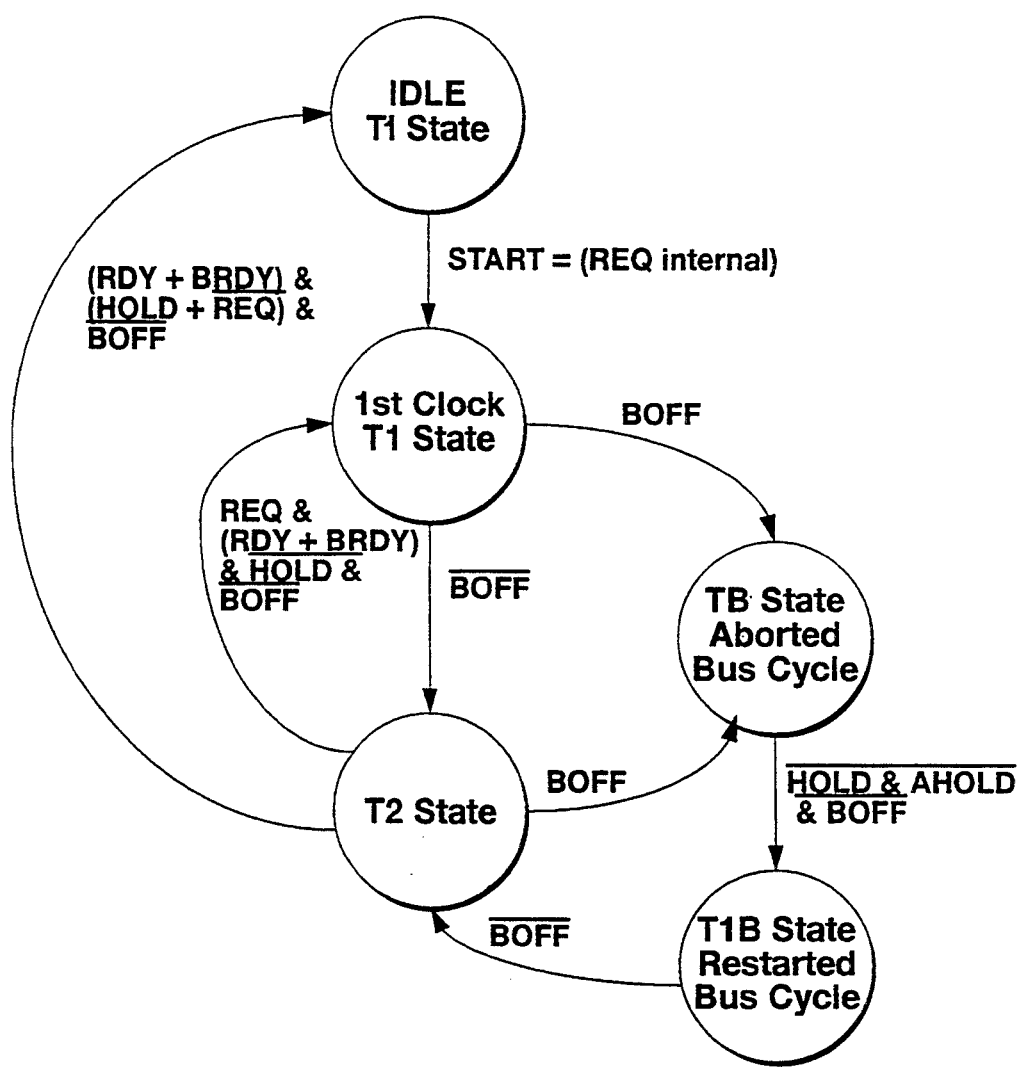
FIGS. 5a, 5b, and 5c are state diagrams which respectively illustrate the overall operation of the microprocessor bus, memory, and external state machines of FIG. 2.

Description of FIG. 5a

In greater detail, FIG. 5a illustrates the overall operation of the microprocessor's bus state machine 12-200 in accessing synchronous bus 12-25 for executing memory read/write operations and I/O operations. As described, this state machine follows that of the microprocessor and in the preferred embodiment, follows the bus protocol of the Intel 486 microprocessor. As seen from FIG. 5a, the state machine 12-200 in an idle state (Ti) and remains in that state until it receives an internal request from the microprocessor in the absence of a hold signal (!HOLD) and a backoff signal (!BOFF). When that occurs, it sequences to state T1 which corresponds to the first clock cycle of a bus cycle. In this state, the valid address and status lines are driven and the address strobe ADS is generated.

In the absence of a backoff, state machine 12-200 sequences to state T2 as shown. When in this state, the second and subsequent bus cycles are performed. During each such cycle, the data lines are driven in the case of a write operation or in the case of a read, the states of the ready (RDY) and burst ready (BRDY) lines are sampled. When a backoff is issued (BOFF), the bus cycle is aborted and the state machine 12-200 sequences to state Tb. While in this state, machine 12-200 performs the second and subsequent clock cycles of an aborted bus cycle. As shown in FIG. 5a, the state machine 12-200 remains in state Tb until there is no longer a hold (!HOLD) and backoff (!BOFF) present. At that time, state machine 12-200 restarts the bus cycle by sequencing to state T1b. While in this state, machine 12-200 performs the first clock cycle of a restarted bus cycle. As in state T1, it drives the valid address and status lines in addition to generating an address strobe (ADS).

As seen from FIG. 5a, state machine 12-200 sequences to state T2 to complete the operation. It is also seen that a backoff (BOFF) also affects sequencing from state T1 to state Tb in the same manner. The state machine 12-200 sequences from state T2 to state T1 in the case of another request or back to state Ti in the absence of a request under the conditions noted in FIG. 5a.

Figure 5B:
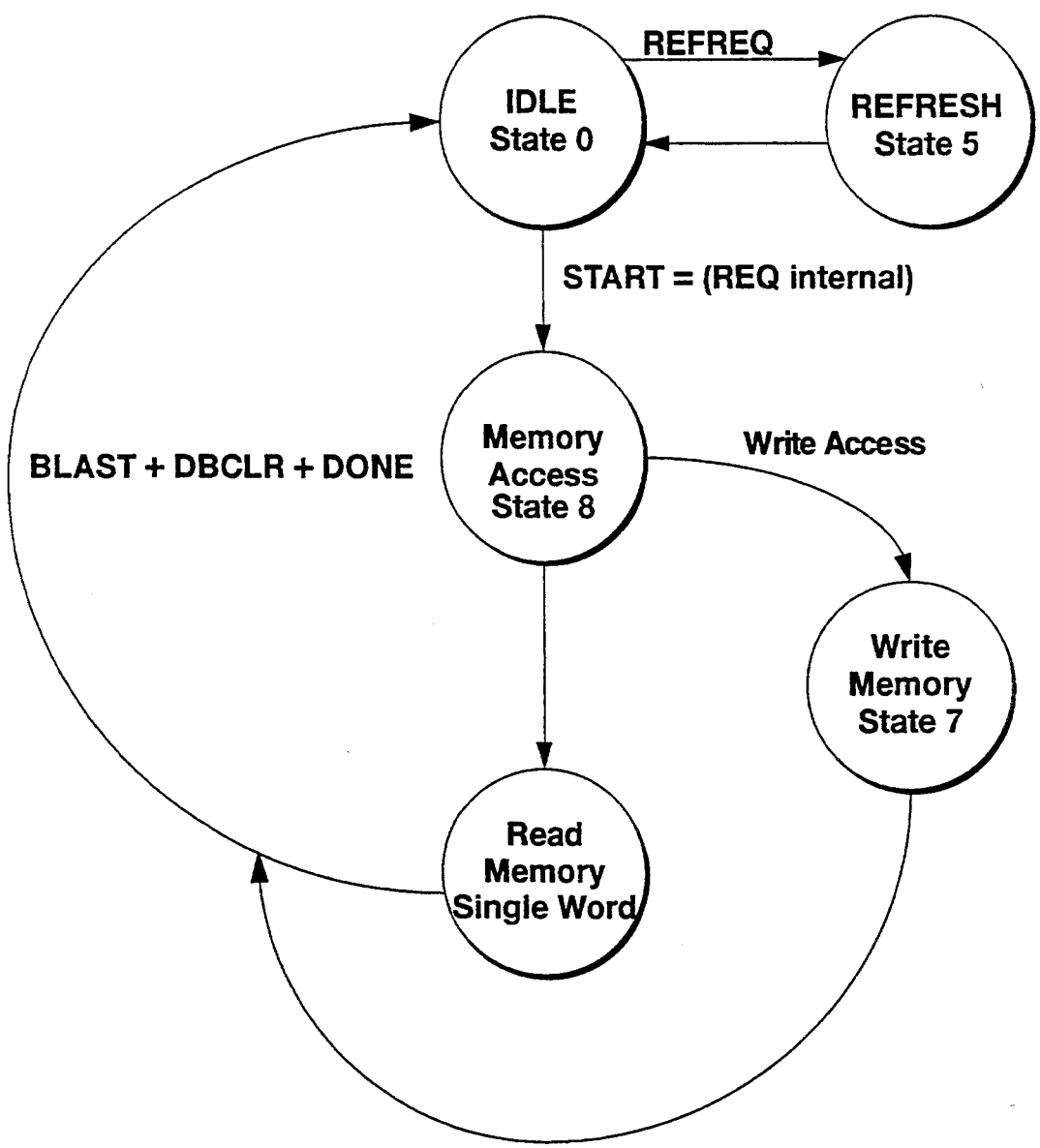

Description of FIG. 5b

FIG. 5b illustrates the overall operation of memory state machine (MSM) 12-300 in processing read and write commands received from microprocessor 12-20 and from system bus 16. As shown, MSM 12-300 starts initially in the idle state (state0). In response to a memory request, memory state machine 12-300 sequences to a memory access state (stateS). If the request is a read, MSM 12-300 then sequences to a read memory single word state (stateA) as shown. When in this state, MSM 12-300 causes the local memory 12-30 to read out the requested data and transfer it to bus 12-25. In the case of a single word transfer, MSM 12-300 returns to the idle state upon the completion of the read operation (DONE). If the transfer involves a multiple word transfer, MSM 12-300 remains in stateA until the local memory 12-30 completes the read operation (DONE) or in the case of a burst operation, until the last word of a four word transfer is read out from local memory 12-30 and transferred to bus 12-25 (BLAST). Of course, if a clear operation occurs (DBCLR), MSM 12-300 returns to the idle state.

When the memory request is a write, MSM 12-300 sequences from state8 to a write memory state (state7) as shown in FIG. 5b during which it causes local memory 12-30 to write the data into the specified location. At the completion of the write, MSM 12-300 returns to the idle state. Additionally, MSM 12-300 also in response to a refresh request sequences to a refresh state (state5). When in this state, MSM 12-300 causes local memory 12-30 to perform a refresh operation and then return to the idle state.

Figure 5C:
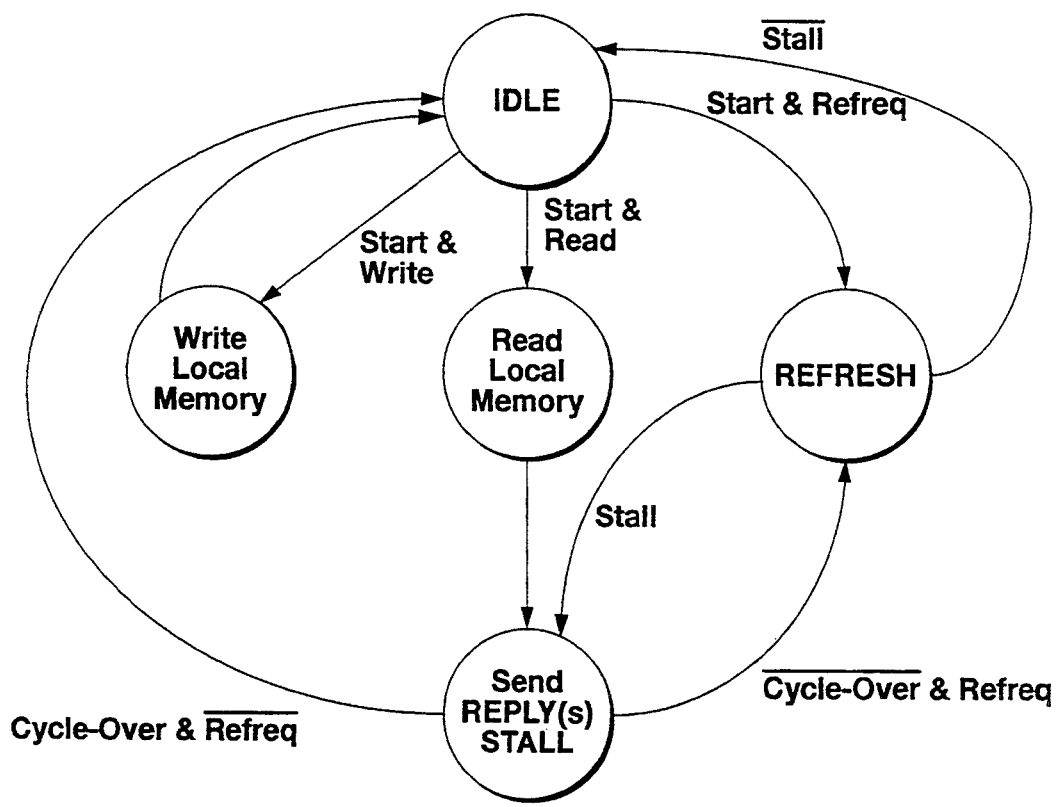

Description of FIG. 5c

FIG. 5c illustrates the overall operation of the external state machine (XSM) 12-66 of the present invention in processing external read and write requests to local memory 12-30. As shown, XSM 12-66 starts in an idle state. In response to a read request and a start pulse, XSM 12-66 sequences to a read memory state. While in this state, it enables the transfer of the read request received from the system bus onto processor local bus 12-25 for execution by local memory 12-30. The XSM 12-66 then sequences to a send reply state where it awaits completion of the read operation. Upon receipt of a cycle over indication, XSM 12-66 returns to the idle state. For a write request, XSM 12-66 sequences to a write state. While in this state, it transfers the system bus write request to processor bus 12-25 for execution by local memory 12-30. Upon such transfer, XSM 12-66 returns to the idle state. Additionally, XSM 12-66 also issues refresh requests to local memory 12-30. As shown in FIG. 5c, in response to a start pulse and refresh request indication, the XSM 12-66 sequences to a refresh state. While in this state, it transfers the request to local memory 12-30. In the absence of a stall condition, XSM 12-66 returns to the idle state.

Description of FIGS. 6 and 7a through 7c

Figure 7B:
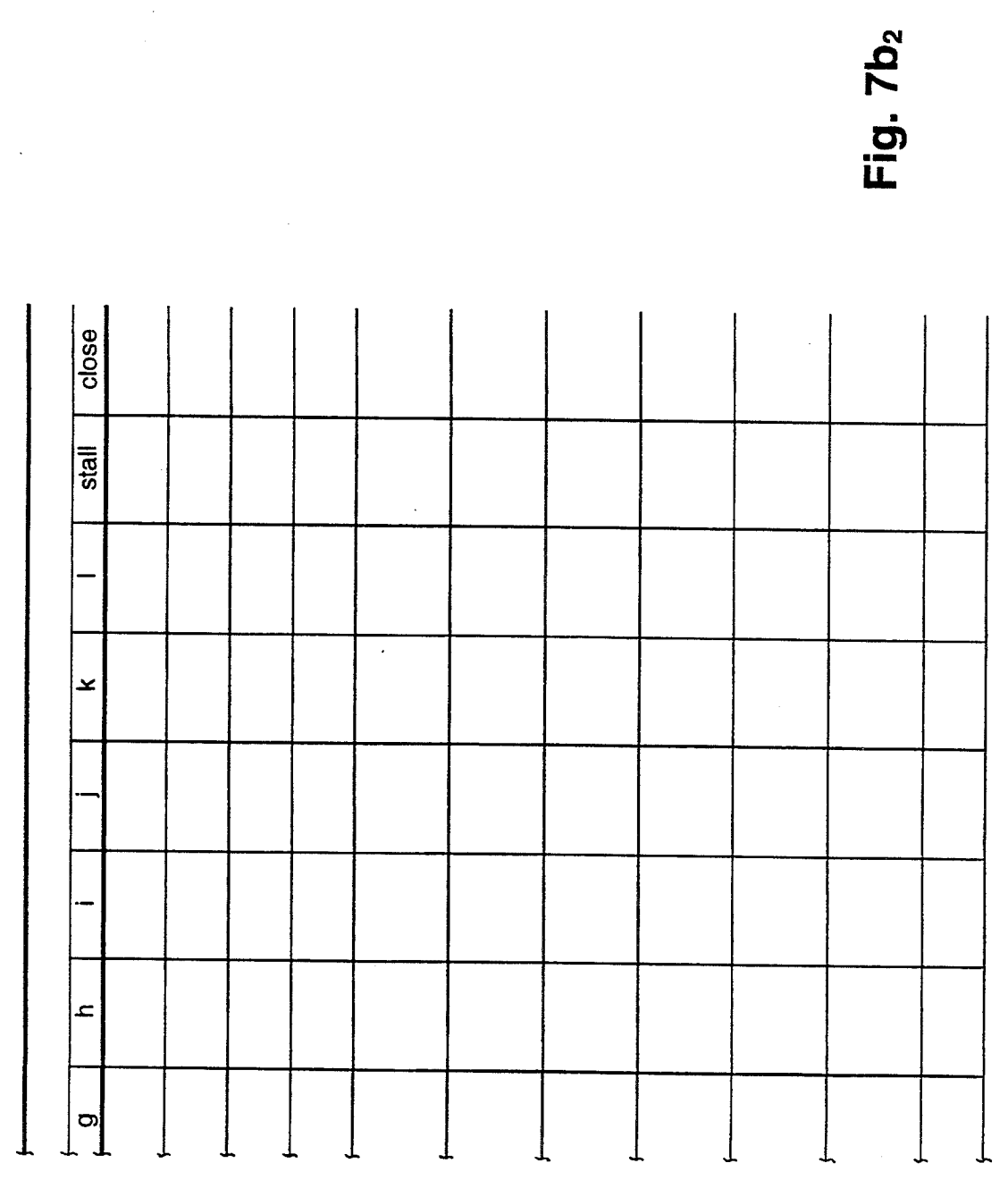

As discussed, the XSM state machine 12-66 converts the system bus commands involving the complicated protocol sequences on system bus 16 into a number of preestablished or precoded synchronous bus sequences. FIGS. 7a through 7c list the different types of system bus commands and their corresponding state sequences.

Referring to FIGS. 7a and 7b, it is seen that the system bus commands are broken into two sets of state sequences, set A and set B. As seen from FIG. 6, set A is the primary sequence while set B is a secondary sequence used for refresh operations as explained herein.

As indicated in FIG. 7a, as a function of the type of command a particular path is selected. The state machine 12-66 sequences down the defined path until it completes the sequence (i.e., reaches the close state) or is stalled (i.e., placed in the stall state).

Figure 6:
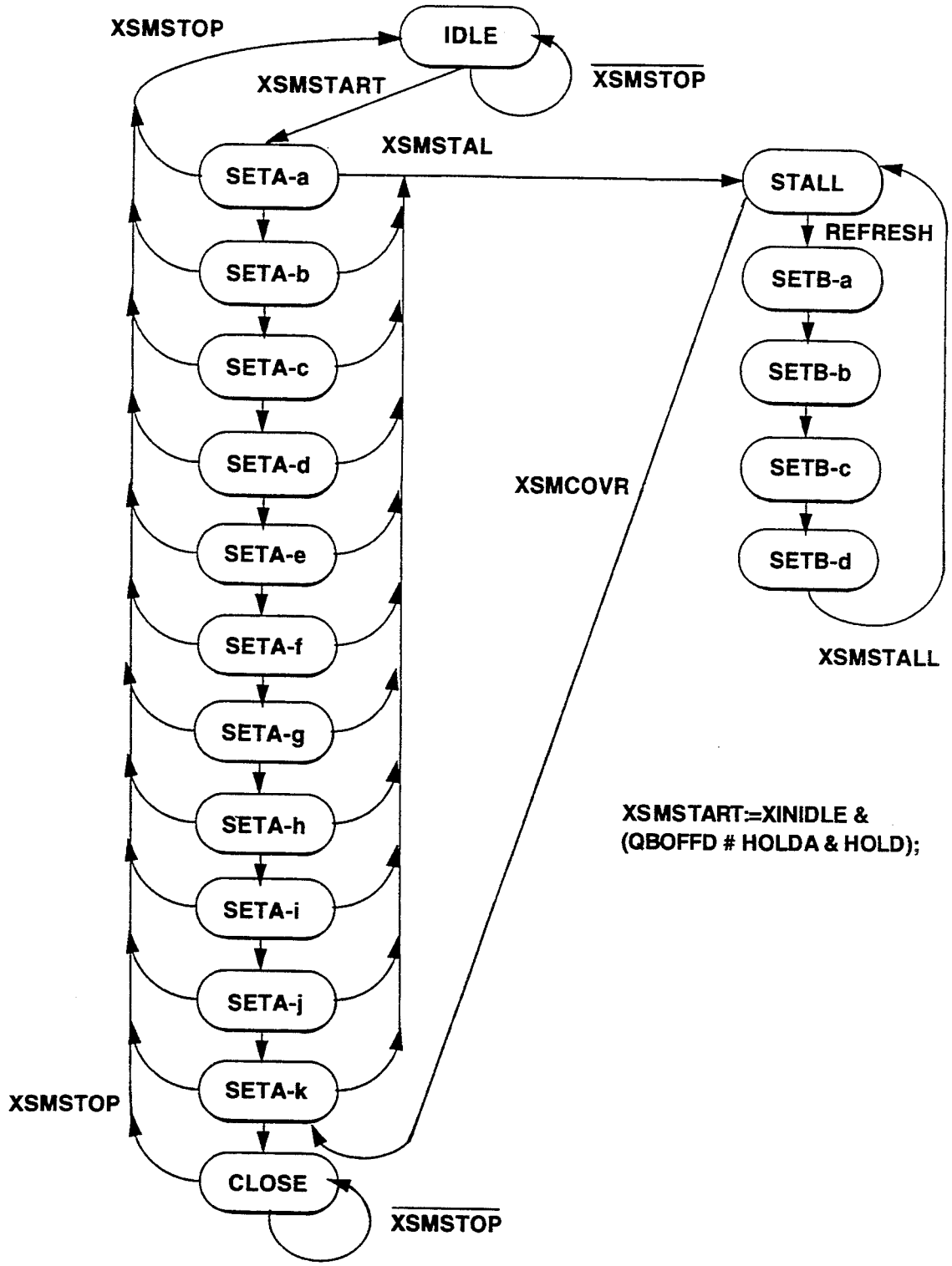
FIG. 6 is a state diagram which illustrates in greater detail, the operation of the state machine of the present invention.

In greater detail, referring to FIG. 6, it is seen that XSM state machine 12-66 starts in an idle state. When a command is received for execution by the XSM state machine 12-66, it sequences from the idle state to set A. It sequences along set A through the states a through k, under the control of two conditions STOP and STALL corresponding to signals XSMSTOP+ and XSMSTAL+ generated by PAL circuit 12-660d. The presence of these conditions are constantly being tested.

If the XSMSTOP signal is true, the state machine counter PAL circuit 12-660b returns to the idle state. The occurrence of XSMSTOP indicates the operation came to a close. The state machine 12-66 is also testing for XSMSTALL in which case it sequences to the stall state. The stall state has two branches, one branch is taken when it receives a cycle over signal XSMCOVR from the system bus interface circuits XTR state machine which causes the state machine counter PAL circuit 12-660b to jump to state k and then to a close state in which it waits for the occurrence of a stop signal. The other branch is taken when it is doing a stall operation and a refresh request is received. Normally, if a refresh request was received, it would sequence to the stall state. When in the stall state, it sequences through states SETB-a through -d and then returns to the stall state. The cycle over signal stays true until a signal from the XSM to the XTR state machines indicates cycle over clear, the state machine goes to state set A-k to acknowledge the command.

The paths shown in FIGS. 7a through 7c can be directly related to the sequencing shown in FIG. 6 by the STOP and STALL equations which determine the jumps in FIGS. 7a through 7b.

The XSM state machine 12-66 is not required to make any decisions or perform branching operations. Therefore, it can operate at maximum speed. As seen from FIG. 7a, in general, in the case of system bus read command, either to local memory 12-30 or to EEPROM 12-69, the state machine 12-66 issues a memory read command, takes the memory data and loads it into the burst array registers and then waits until the data transfer operation on system bus 16 is completed. Therefore, as indicated in FIG. 7a, the state machine 12-66 sequences through one or more states corresponding to the time it takes to complete the read and then generates an ASK signal to send back the requested memory data. The state machine enters the stall state to await receipt of cycle over signal XSMCOVR. When the cycle is over, the state machine 12-66 returns to the idle state to await receipt of the next command.

In greater detail, as seen from FIG. 7a, in the case of a read EEPROM command, it is assumed that the state machine 12-66 is in an idle state. The read EEPROM command causes the signals MREF through BYTE to be in the states indicated in FIG. 7c. Assuming that the XSM state machine 12-66 has access to local bus 12-25, PAL circuit 12-660a generates start signal XSMSTART. Signal XSM START causes state machine counter PAL circuit 12-660b to sequence through the start state to state a. This causes PAL circuit 12-660e to set signal EEREAD-XT and PAL 12-660d to reset first cycle signal FIRST+. This enables the read out of the word addressed by the RXADDIN register 12-44, enabled by signal EARENB−, generated by PAL circuit 12-660e, to be read out onto Q bus for loading into the burst array registers of block 12-58. Sequencing of PAL circuit 12-660b continues through states b through d.

In state e, the PAL circuit 12-660 sets signal XSMASK+ signalling its request for sending of data back to the requestor. The signal is forwarded to the system bus interface circuits for requesting a system bus cycle of operation. By automatically setting signal XSMASK, the XSM state machine has been preprogrammed to anticipate the memory read being completed before state e. Actually, the read EEPROM data is loaded in state h. In state f, the state machine PAL circuit 12-660h resets the hold and backoff signals enabling any other state machine (i.e., microprocessor 12-20) to access local bus 12-25.

The read EEPROM data is loaded into the burst register array in state h, in response to the left, right burst addresses. Next, the PAL circuit 12-660d generates signal XSMSTAL+ in state i. In state j, the PAL circuit 12-660e resets the read EEPROM signal EEREAD-XT. On the next clock, the state machine 12-66 sequences to state k wherein PAL circuit 12-660h sets the XTR register clear signal XTRCLR+ which causes PAL circuit 12-660i to reset the appropriate XTR queue register busy signal defined by signal X1NEXT+. The state machine remains in the stall state until the system bus cycle is over which is signalled by signal XSMCOVR. This causes PAL circuit 12-660d to generate stop signal XSMSTOP+, causing the XSM state machine counter PAL circuit 12-660b to return to the idle state signalled by signal XINIDLE+.

As seen from FIG. 7a, the write EEPROM command is carried out in a similar manner. That is, in response to a write EEPROM command being received from system bus 16, the state machine counter PAL circuit 12-660b waits for start signal XSMSTRT− to be generated by PAL circuit 12-660a. Again, in state a, the PAL circuit 12-660d resets the first cycle indicator signal FIRST+, which is used in conjunction with other commands. In state b, PAL circuit 12-660e sets the write enable signal WREPEU−, causing the system bus data to be written into the location specified by the external address previously loaded into the EEPROM external address register via RXDATAIN register 12-42 from data lines BSDT09-15 of system bus 16, in response to signal EARENB−.

In state c, PAL circuit 12-660j resets the QBHOLD and QBBOFF signals releasing local bus 12-25. As seen from FIG. 7a, during state e, PAL circuit 12-660e resets EEPROM write signal WREPEU−, and PAL circuit 12-660h sets XTR register clear signal XTRCLR+ which causes PAL circuit 12-660i to reset the appropriate XTR queue register busy signal defined by signal X1NEXT+. during state f, PAL circuit 12-660d sets stop signal XSMSTOP+ which causes XSM state machine counter PAL circuit 12-660b to return to the idle state.

In addition to processing EEPROM read and write commands, XSM state machine 12-66 handles different types of system bus write commands, such as single or double even and double odd write commands. By contrast, local bus 12-25 operates strictly on a double word aligned boundary (i.e., all 4 byte words begin at addresses that are multiples of four).

considering the above in greater detail, in the case of a write single command which coded as indicated in FIG. 7c, the PAL circuit 12-660a again generates start signal XSMSTART when hold acknowledge signal HOTHLDA−, backoff signal QBOFFD+ and hold signal QBHOLD are set in the proper states indicating that the XSM state machine 12-66 has obtained control of local bus 12-25. As seen from FIG. 7a, when the state machine counter PAL circuit 12-660b sequences to the start state, it generates address strobe signals QBADS− and QBEADS−. Since microprocessor 12-20 is backed off bus 12-25, local memory 12-30 believes that microprocessor 12-20 has issued the memory write command. Signal QBEADS− is a signal which the microprocessor 12-66 will take in and use to invalidate the contents of the location if it resides in cache which is being written by the XSM state machine 12-66. This will maintain coherency between the microprocessor's internal cache and local memory 12-30 by causing the microprocessor 12-20 to obtain a new copy of that location from local memory 12-30 the next time it attempted to be read from cache.

The first (FIRST) cycle indicator is again reset in state a for housekeeping purposes. During state b, PAL circuit 12-660h sets X register clear signal XTRCLR which causes PAL circuit 12-660i to reset the appropriate XTR queue register busy signal defined by signal X1NEXT+ anticipating that the XSM state machine 12-66 will soon complete the command and can start the next transaction. The XTR busy signal is forwarded to the system bus interface circuits and enables a next command to be loaded into the available queue register.

As seen from FIG. 7a, the state machine 12-66 again resets the hold and backoff signals QBBOFF, QBBOFFD− and QBHOLD+ during state d, releasing bus 12-25. During the next clock, while in state e, the PAL circuit 12-660d sets the stop signal XSMSTOP, and the machine state counter PAL circuit 12-660b returns to the idle state. As seen from FIG. 7a, state machine 12-66 follows the same sequence.

In the case of a write double odd command, the sequence is also basically the same. However, the address converter circuits 12-52 generate write mask signals which indicate to local memory 12-30 that it is to perform a two byte write operation and whether they are the two right or two left bytes. These signals are applied as byte enables BE0–BE3 which form the low order address and provide linear select for the four bytes of the 32-bit local bus address bus. In the case of the write double odd command, the right two bytes are written first and then the left two bytes. This results in local memory 12-30 writing one half of the double word.

As seen from FIG. 7a, the first cycle indicator is set during state b, and the stop signal XSMSTOP is generated after which the XSM state machine 12-66 returns to the idle state. Since the XTR register clear signal XTRCLR was not set, the XTR busy signal was not reset, indicating that the XSM state machine 12-66 was not done executing the write command. The command is completed during the second sequence wherein the second half or left two bytes are written by local memory 12-30. That is, as soon as the XSM state machine is again able to gain control of local bus 12-25, PAL circuit 12-660a generates another start signal XSMSTRT. As seen from FIG. 7a, the state machine 12-66 generates address strobe signal ADS and EADS. During state a, state machine 12-66 resets the first cycle indicator signalling that the write command will be completed during this sequence. Again, the backoff and hold signals are reset, and stop signal XSMSTOP is generated which results in state machine 12-66 returning to the idle state. Thus, state machine 12-66 breaks down the system bus write double odd command into two write sequences on local bus 12-25 (i.e., into a single word odd, single word even). In the first sequence, the register storing the incremented or initial command address is used while in the second sequence, the registers storing incremented address is used.

The read types of system bus commands are processed in a similar fashion. That is, the burst read commands are broken into two burst transactions or sequences during which 16 bytes are read out in each transaction. This provides the number of bytes transferred in the case of a system bus burst operation (i.e., 32 bytes). Again, the state of the first cycle indicator defines which cycle is being performed. As seen from FIG. 7a, during the read first burst sequence, the state machine 12-66 sets the address strobe ADS− and not EADS−, because no cache invalidation is necessary, since local memory 12-30 is only executing a read. As in the case of a write, the first (FIRST) cycle indicator is set. During state d, the left and right words read out from local memory 12-30 are loaded into double word register zero of the burst register array 12-58.

Also, the signal XSMASK is set which signals the system interface circuits to request a system bus cycle of operation. During states e and f, the left and right words are loaded into double word registers 1 and 2. Also, the hold and backoff signals QBOFF and QBHOLD are reset, enabling microprocessor 12-20 access to local bus 12-25. During state g, the odd and even words are loaded into double word register 3 and stall signal XSMSTAL is set.

The state machine 12-66 sequences through states h through i and in state j, it enters a stall state waiting for the cycle over signal XSMCOVR+. In response to signal XSMCOVR+, the state machine 12-66 sets the stop signal XSMSTOP, resulting in the state machine 12-66 returning in the idle state. Since the XTR register busy was not reset (i.e., signal XTRCLR was not generated), the command remains in the XTR queue register, and the first cycle indicator remains set.

When state machine 12-66 again gains control of local bus 12-25, it executes the read second burst sequence of FIG. 7a. As seen from FIG. 7a, this sequence is basically the same as the read first burst sequence. However, the state machine 12-66 does not set the first cycle indicator in state b and sets the XTR register clear signal XTRCLR in state k. This clears the command in the XTR queue register, completing the burst operation sequence.

The read single/double word even sequence is carried out by the single sequence of FIG. 7a. The sequence is similar to the read EEPROM sequence. Again, the transaction is a read to local memory 12-30. Since it is not a burst operation, state machine 12-66 is required to signal local memory 12-30 when it is done. Thus, during state a, PAL circuit 12-660h sets burst last signal QBBLAST− signalling memory. After two clocks, it resets burst last (QBBLAST−) signal in state c signalling local memory that the next time the memory returns ready signal BRDY, the operation is over.

The read double word command of FIG. 7c is executed by performing two sequences similar to the write double word command. These correspond to the read first word of double odd and read second word of double odd in FIG. 7a. It will be noted that these sequences are basically the same as the read single/double even sequence. Again, during states a and c of the first sequence, the burst last signal is set and reset. The XTR command queue register is not cleared, and the first cycle indicator remains set. This results in the execution of the second sequence during which the first cycle indicator is reset and XTR register signal XTRCLR is set, completing execution of the read double word odd command.

From the above, it is seen how the complex system bus commands are executed on local bus 12-25 with few simple sequences which follow the same bus protocol as used by microprocessor 12-20.

Refresh Operations

In addition to the above, the XSM state machine 12-66 also processes refresh operations, by executing the different sequences of FIG. 7b, under the control of refresh state machine PAL circuit 12-660k. Refresh requests are generated by a timer circuit, not shown, which produces signal REFREQT+ approximately every 16 microseconds.

This ensures that local memory 12-30 will always be refreshed at the proper rate, notwithstanding the command being executed. That is, if the sequences of FIG. 7a were used, it is possible for a refresh request to come in when the state machine 12-66 is in a stall state awaiting for a cycle over signal. This enables the state machine 12-66 when, in the stall state, to execute the sequence shown in FIG. 7b for each of the different system bus read commands. It will be noted that the same sequence is followed for all of these commands.

Briefly, if a refresh command is received (i.e., signal REFREQT+ is applied) when the XSM state machine 12-66 is in a stall state, then PAL circuits 12-660a and 12-660b generate start signal XSMSTRT− and REFRESH+, respectively, in addition to address strobe signal ADS− as soon as the XSM state machine gains control of local bus 12-25. The local memory 12-30 performs a refresh cycle of operation using an internally provided generated address by local memory 12-30. This is followed by PAL circuit 12-660*h* generating clear REFRCLR+ which results in the resetting of the timer circuit refresh request REFREQT+ during state 5 a. As seen from FIG. 7*b*, state machine 12-66 resets the hold and backoff signals, releasing control of local bus 12-25 and returns to the stall state. If the cycle over signal XSMCOVR occurs, state machine 12-66 completes the sequence of FIG. 7*a* being executed prior to the refresh request which is defined by the contents of XTR queue register.

The state machine of the present invention converts the complex system bus commands into simple sequences, enabling operations to take place as fast as possible.

Each sequence is executed, in effect, through a three-stage pipeline in which the first stage, upon generating a start, enables sequencing to continue alternately between the next two stages. These stages define the cycle or state and the subcommand.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

A. PAL CIRCUIT EQUATION SECTIONS FOR XSM STATE MACHINE 12-66 - FIGURE 3

I. ADS and Start Pulse Generator Circuit 12-660a - XCM46.

II. State Machine Counter Circuit 12-660b - XCM48.

III. Subcommand Generator Circuit 12-660c - XCM49.

IV. State Machine Stop/Stall Generator Circuit 12-660d - XCM53.

V. EEPROM Read/Write State Machine Circuit 12-660e - XCM50.

VI. Burst Register Controller Circuit 12-660f - XCM51.

VII. Burst Address Counter Circuit 12-660g - XCM63.

VIII. State Control Register generator Circuit 12-660h - XCM52.

IX. XTR1 & XTR2 Busy Generator Circuit 12-660i - XCM08.

X. Backoff and Hold Generator Circuit 12-660j - XCM09.

XI. Refresh State and Addres Enables Machine Circuit 12-660k - XCM47.

B. EQUATIONS FOR SYSTEM BUS COMMAND PREDECODING.

C. EQUATIONS FOR WRITE MASK GENERATION.

D. PAL CIRCUIT DESCRIPTIONS AND EQUATIONS FOR ADDRESS INCREMENTING CIRCUITS.

A. PAL CIRCUIT DESCRIPTIONS AND EQUATIONS FOR XSM STATE MACHINE 12-66 - FIGURE 3

Description of equation symbols:
(Where # = OR: ! = negation; and & = AND)

I. ADS & Start Pulse Generator Circuit 12-660a

MODULE XCM46
Pin Specifications:
  (Inputs)

| | |
|---|---|
| REFCLK | PIN 1; |
| XSMCOVR | PIN 2; |
| !HOTHLDA | PIN 3; |
| QBOFFD | PIN 4; |
| !HOTWR | PIN 5; |
| XBEEPRM | PIN 6; |
| X1NEXT | PIN 7; |
| XBWRIT | PIN 8; |
| XINIDLE | PIN 9; |
| QBHOLD | PIN 10; |
| XINSTAL | PIN 11; |
| REFREQT | PIN 14; |

(Outputs)

```
!HOLDACK   PIN 15;
!XSMSTRT   PIN 16;
!X2DTEN    PIN 18;
!EDTPTQ    PIN 19;
!X1DTEN    PIN 20;
!QBADS     PIN 21;
!QBEADS    PIN 22;
```

Actual logic equations.

EQUATIONS

```
EDTPTQ  : =  !HOTHLDA & !QBOFFD & HOTWR
          #        HOTHLDA & !XBEEPRM & !XBWRIT
          #        QBOFFD  & !XBEEPRM & !XBWRIT;

X1DTEN  : =  HOTHLDA & X1NEXT & XBWRIT
          #        QBOFFD & X1NEXT & XBWRIT;

X2DTEN  : =  HOTHLDA & !X1NEXT & XBWRIT
          #        QBOFFD & !X1NEXT & XBWRIT;

QBEADS  : =  XINIDLE & (QBOFFD # HOTHLDA & QBHOLD)
          &  !XBEEPRM & XBWRIT & !REFREQT & !QBEADS;

QBADS   : =  XINIDLE & (QBOFFD # HOTHLDA & QBHOLD) &
             !XBEEPRM & !QBADS # XINSTAL & (QBOFFD #
             HOTHLDA & QBHOLD) & !XSMCOVR & REFREQT;

XSMSTRT : =  XINIDLE 7 (QBOFFD # HOTHLDA & QBHOLD);

HOLDACK : =  HOTHLDA;
```

II. State Machine Counter Circuit 12-660b
MODULE XCM48

Pin Specifications:
(Inputs)

```
REFCLK      PIN  1;
MBMCLR      PIN  2;
!XSMSTRT    PIN  3;
REFREQT     PIN  4;
XSMCOVR     PIN  5;
"REFCLK     PIN  6;  for proper loading
REFRESH     PIN  9;
XSMSTOP     PIN 10;
```

(Outputs)

```
XSMCSA      PIN 21;
XSMCSB      PIN 20;
XSMCSC      PIN 17;
XSMCSD      PIN 18;
XSMCSE      PIN 19;
XINSTAL     PIN 14;
XINIDLE     PIN 23;
```

EQUATES:

S_REG = [XSMCSA,XSMCSB,XSMCSC,XSMCSD,XSMCSE];

State Machine State Definitions

```
idle     =   ^B00000;
stall    =   ^B00001;
SETA_a   =   ^B00010;
SETA_b   =   ^B00011;
SETA_c   =   ^B00100;
SETA_d   =   ^B00101;
SETA_e   =   ^B00110;
```

| | | |
|---|---|---|
| SETA_f | = | ^B00111; |
| SETA_g | = | ^B01000; |
| SETA_h | = | ^B01001; |
| SETA_i | = | ^B01010; |
| SETA_j | = | ^B01011; |
| SETA_k | = | ^B01100; |
| SETA_l | = | ^B01101; |
| SETA_m | = | ^B01110; |
| close | = | ^B01111; |
| SETB_a | = | ^B10000; |
| SETB_b | = | ^B10100; |
| SETB_c | = | ^B11000; |
| SETB_d | = | ^B11100; |

End of State Machine State Definitions

EQUATIONS

XINSTAL : = XSMSTAL & !MBMCLR
       # (S_REG==stall) & !XSMCOVR & !REFRESH & !MBMCLR;

XINIDLE : = XSMSTOP # MBMCLR
       # (S_REG==idle) & !XSMSTRT;

State Machine Equations:

STATE_DIAGRAM S_REG

STATE idle:
IF MBMCLR
THEN idle
ELSE
IF XSMSTRT
THEN SETA_a
ELSE idle;

```
STATE stall:
IF MBMCLR
THEN idle
ELSE
IF REFRESH
THEN SETB_a
ELSE
IF XSMCOVR
THEN SETA_k
ELSE stall;

STATE close:
IF MBMCLR # XSMSTOP
THEN idle
ELSE close;

STATE SETA_a:
IF MBMCLR # XSMSTOP
THEN idle
ELSE
IF XSMSTAL
THEN stall
ELSE SETA_b;

STATE SETA_b:
IF MBMCLR # XSMSTOP
THEN idle
ELSE
IF XSMSTAL
THEN stall
ELSE SETA_c;

STATE SETA_c:
IF MBMCLR # XSMSTOP
THEN idle
ELSE
IF XSMSTAL
THEN stall
```

```
    ELSE SETA_d;

STATE SETA_d:
IF MBMCLR # XSMSTOP
THEN idle
ELSE
IF XSMSTAL
THEN stall
ELSE SETA_e;

STATE SETA_e:
IF MBMCLR # XSMSTOP
THEN idle
ELSE
IF XSMSTAL
THEN stall
ELSE SETA_f;

STATE SETA_f:
IF MBMCLR # XSMSTOP
THEN idle
ELSE
IF XSMSTAL
THEN stall
ELSE SETA_g;

STATE SETA_g:
IF MBMCLR # XSMSTOP
THEN idle
ELSE
IF XSMSTAL
THEN stall
ELSE SETA_h;

STATE SETA_h:
IF MBMCLR # XSMSTOP
THEN idle
```

```
ELSE
IF XSMSTAL
THEN stall
ELSE SETA_i;

STATE SETA_i:
IF MBMCLR # XSMSTOP
THEN idle
ELSE
IF XSMSTAL
THEN stall
ELSE SETA_j;

STATE SETA_j:
IF MBMCLR # XSMSTOP
THEN idle
ELSE
IF XSMSTAL
THEN stall
ELSE SETA_l;

STATE SETA_k:
IF MBMCLR
THEN idle
ELSE close;

STATE SETA_l:
IF MBMCLR # XSMSTOP
THEN idle
ELSE
IF XSMSTAL
THEN stall
ELSE SETA_m;

STATE SETA_m:
IF MBMCLR # XSMSTOP
THEN idle
ELSE SETA_m;
```

Refresh During Stall

```
STATE SETB_a:
IF MBMCLR
THEN idle
ELSE SETB_b;

STATE SETB_b:
if MBMCLR
THEN idle
ELSE SETB_c;

STATE SETB_c:
IF MBMCLR
THEN idle
ELSE SETB_d;

STATE SETB_d:
IF MBMCLR
THEN idle
ELSE stall;
```

III. <u>Subcommand Generator Circuit 12-660c</u>
<u>MODULE XCM49</u>

<u>Pin Specifications</u>:
    (Inputs)

| | | |
|---|---|---|
| REFCLK | PIN | 1; |
| MBMCLR | PIN | 2; |
| XBEEPRM | PIN | 3; |
| XBWRIT | PIN | 4; |
| XBDWODD | PIN | 5; |
| FIRST | PIN | 6; |
| XBBURST | PIN | 7; |
| XBAD27 | PIN | 8; |
| REFREQT | PIN | 9; |

| | |
|---|---|
| !XSMSTRT | PIN 10; |
| XSMSTOP | PIN 11; |
| REFRESH_I | PIN 13; |

(Outputs)

| | |
|---|---|
| XSMCCD | PIN 18; |
| XSMCCC | PIN 19; |
| XSMCCB | PIN 20; |
| XSMCCA | PIN 21; |
| ATE49 | PIN 23; |

EQUATES

C_REG = [XSMCCA,XSMCCB,XSMCCC,XSMCCD];

State Machine Command Definitions

| | |
|---|---|
| NOP | = ^B0000; |
| READEE | = ^B0001; |
| WRITEE | = ^B0010; |
| WRITESND | = ^B0011; |
| WRITESIN | = ^B0100; |
| WRITEFST | = ^B0101; |
| FSTBURST | = ^B0110; |
| SNDBURST | = ^B0111; |
| READSND | = ^B1000; |
| READSIN | = ^B1001; |
| READFST | = ^B1010; |
| REFRESH | = ^B1011; |
| UNC | = ^B1100; |
| UND | = ^B1101; |
| UNE | = ^B1110; |
| MCLEAR | = ^B1111; |

End of Command Definitions

EQUATIONS

STATE_DIAGRAM C_REG

STATE NOP:
IF MBMCLR
THEN MCLEAR
ELSE
IF XSMSTRT & REFRESH_I
THEN REFRESH
ELSE
IF XSMSTRT & XBEEPRM & !XBWRIT & !REFRESH_I
THEN READEE
ELSE
IF XSMSTRT & XBEEPRM & XBWRIT & !REFRESH_I
THEN WRITEE
ELSE
IF XSMSTRT & !XBEEPRM & XBWRIT & FIRST & XBDWOOD &
   !REFRESH_I
THEN WRITESND
ELSE
IF XSMSTRT & !XBEEPRM & XBWRIT & !FIRST & !XBDWOOD &
   !REFRESH_I
THEN WRITESIN
ELSE
IF XSMSTRT & !XBEEPRM & XBWRIT & !FIRST & XBDWOOD &
   !REFRESH_I
THEN WRITEFST
ELSE
IF XSMSTRT & XBBURST &  FIRST & !REFRESH_I #
   XSMSTRT & XBBURST & !FIRST & !REFRESH_I & XBAD27
THEN SNDBURST
ELSE
IF XSMSTRT & XBBURST & !FIRST & !XBAD27 & !REFRESH_I
THEN FSTBURST
ELSE

```
IF XSMSTRT & !XBEEPRM & !XBWRIT & !XBBURST & FIRST &
   !REFRESH_I
THEN READSND
ELSE
IF XSMSTRT & !XBEEPRM & !XBWRIT & !XBBURST & !FIRST &
   !XBDWOOD & !REFRESH_I
THEN READSIN
ELSE
IF XSMSTRT & !XBEEPRM & !XBWRIT & !XBBURST & !FIRST &
   XBDWODD & !REFRESH_I
THEN READFST
ELSE NOP;

STATE REFRESH:
IF MBMCLR
THEN MCLEAR
ELSE
IF XSMSTOP
THEN NOP
ELSE REFRESH;

STATE READEE:
IF MBMCLR
THEN MCLEAR
ELSE
IF XSMSTOP
THEN NOP
ELSE READEE;

STATE WRITEE:
IF MBMCLR
THEN MCLEAR
ELSE
IF XSMSTOP
THEN NOP
ELSE WRITEE;
```

```
STATE WRITESND:
IF MBMCLR
THEN MCLEAR
ELSE
IF XSMSTOP
THEN NOP
ELSE WRITESND;

STATE WRITESIN:
IF MBMCLR
THEN MCLEAR
ELSE
IF XSMSTOP
THEN NOP
ELSE WRITESIN;

STATE WRITEFST:
IF MBMCLR
THEN MCLEAR
ELSE
IF XSMSTOP
THEN NOP
ELSE WRITEFST;

STATE SNDBURST:
IF MBMCLR
THEN MCLEAR
ELSE
IF XSMSTOP
THEN NOP
ELSE SNDBURST;

STATE FSTBURST:
IF MBMCLR
THEN MCLEAR
ELSE
IF XSMSTOP
```

```
THEN NOP
ELSE FSTBURST;

STATE READSND:
IF MBMCLR
THEN MCLEAR
ELSE
IF XSMSTOP
THEN NOP
ELSE READSND;

STATE READSIN:
IF MBMCLR
THEN MCLEAR
ELSE
IF XSMSTOP
THEN NOP
ELSE READSIN;

STATE READFST:
IF MBMCLR
THEN MCLEAR
ELSE
IF XSMSTOP
THEN NOP
ELSE READFST;

STATE UNC:
IF MBMCLR
THEN MCLEAR
ELSE NOP;

STATE UND:
IF MBMCLR
THEN MCLEAR
ELSE NOP
```

STATE UNE:
IF MBMCLR
THEN MCLEAR
ELSE NOP;

STATE MCLEAR:
IF MBMCLR
THEN MCLEAR
ELSE NOP;

IV. <u>State Machine Stop/Stall
    Generator Circuit 12-660d</u>

<u>MODULE XCM53</u>

<u>Pin Specifications</u>:

(Inputs)

| | |
|---|---|
| REFCLK | PIN 1; |
| MBMCLR | PIN 2; |
| XSMTMOT | PIN 3; |
| XSMCSA | PIN 4; |
| XSMCSB | PIN 5; |
| XSMCSC | PIN 6; |
| XSMCSD | PIN 7; |
| XSMCSE | PIN 8; |
| XSMCCA | PIN 9; |
| XSMCCB | PIN 10; |
| XSMCCC | PIN 11; |
| XSMCCD | PIN 13; |

(Outputs)

| | |
|---|---|
| FRSTCLR | PIN 17; |
| FIRST | PIN 18; |
| XSMSTOP | PIN 19; |
| XSMSTAL | PIN 20; |

EQUATES

S_REG = [XSMCSA,XSMCSB,XSMCSC,XSMCSD,XSMCSE];
C_REG = [XSMCCA,XSMCCB,XSMCCC,XSMCCD];

State Machine State Definitions

```
idle     =   ^B00000;
stall    =   ^B00001;
SETA_a   =   ^B00010;
SETA_b   =   ^B00011;
SETA_c   =   ^B00100;
SETA_d   =   ^B00101;
SETA_e   =   ^B00110;
SETA_f   =   ^B00111;
SETA_g   =   ^B01000;
SETA_h   =   ^B01001;
SETA_i   =   ^B01010;
SETA_j   =   ^B01011;
SETA_k   =   ^B01100;
SETA_l   =   ^B01101;
SETA_m   =   ^B01110;
close    =   ^B01111;
SETB_a   =   ^B10000;
SETB_b   =   ^B10100;
SETB_c   =   ^B11000;
SETB_d   =   ^B11100;
```

End of State Machine State Definitions

State Machine Command Definitions

```
NOP        =   ^B0000;
READEE     =   ^B0001;
WRITEE     =   ^B0010;
WRITESND   =   ^B0011;
WRITESIN   =   ^B0100;
```

```
WRITEFST    =    ^B0101;
FSTBURST    =    ^B0110;
SNDBURST    =    ^B0111;
READSND     =    ^B1000;
READSIN     =    ^B1001;
READFST     =    ^B1010;
REFRESH     =    ^B1011;
MCLEAR      =    ^B1111;
```

End of Command Definitions

EQUATIONS

```
XSMSTAL: =       (C_REG==READEE) & (S_REG==SETA_i)
             #   (C_REG==SNDBURST) & (S_REG==SETA_g)
             #   (C_REG==FSTBURST) & (S_REG==SETA_g)
             #   (C_REG==READSND) & (S_REG==SETA_e)
             #   (C_REG==READSIN) & (S_REG==SETA_e)
             #   (S_REG==SETB_c);

XSMSTOP: =       (S_REG==close)
             #   (C_REG==WRITEE) & (S_REG==SETA_f)
             #   (C_REG==WRITESND) & (S_REG==SETA_e)
             #   (C_REG==WRITESIN) & (S_REG==SETA_e)
             #   (C_REG==WRITEFST) & (S_REG==SETA_d)
             #   (C_REG==READFST) & (S_REG==SETA_d)
             #   (C_REG==REFRESH) & (S_REG==SETA_c);

FIRST   : =      (C_REG==WRITEFST) & (S_REG==SETA_b)
             #   (C_REG==FSTBURST) & (S_REG==SETA_b)
             #   (C_REG==READFST) & (S_REG==SETA_b)
             #   FIRST & !FRSTCLR;

FRSTCLR: =    (S_REG==SETA_a) & !(C_REG==REFRESH)
              #(C_REG==MCLEAR)
              # XSMTMOT;
```

V. EEPROM Read/Write State Machine Circuit 12-660e
MODULE XCM50

Pin Specifications:
(Inputs)

```
REFCLK       PIN  1;
EEAD15       PIN  3;
XSMCSA       PIN  4;
XSMCSB       PIN  5;
XSMCSC       PIN  6;
XSMCSD       PIN  7;
XSMCSE       PIN  8;
XSMCCA       PIN  9;
XSMCCB       PIN 10;
XSMCCC       PIN 11;
XSMCCD       PIN 13;
```

(Outputs)

```
!WREPOD      PIN 15;
ODECLR       PIN 16;
!WREPEV      PIN 17;
!EARENB1     PIN 18;
EARENB2      PIN 19;
EERCLR       PIN 20;
!EEREAD      PIN 21;
EARENCL      PIN 22;
```

EQUATES:

C_REG = [XSMCCA,XSMCCB,XSMCCC,XSMCCD];

S_REG = [XSMCSA,XSMCSB,XSMCSC,XSMCSD,XSMCSE];

State Machine State Definitions

```
idle         =         ^B00000;
```

| | | |
|---|---|---|
| stall | = | ^B00001; |
| SETA_a | = | ^B00010; |
| SETA_b | = | ^B00011; |
| SETA_c | = | ^B00100; |
| SETA_d | = | ^B00101; |
| SETA_e | = | ^B00110; |
| SETA_f | = | ^B00111; |
| SETA_g | = | ^B01000; |
| SETA_h | = | ^B01001; |
| SETA_i | = | ^B01010; |
| SETA_j | = | ^B01011; |
| SETA_k | = | ^B01100; |
| SETA_l | = | ^B01101; |
| SETA_m | = | ^B01110; |
| close | = | ^B01111; |
| SETB_a | = | ^B10000; |
| SETB_b | = | ^B10100; |
| SETB_c | = | ^B11000; |
| SETB_d | = | ^B11100; |

End of State Machine State Definitions

State Machine Command Definitions

| | | |
|---|---|---|
| NOP | = | ^B0000; |
| READ | = | ^B0001; |
| WRITEE | = | ^B0010; |
| WRITESND | = | ^B0011; |
| WRITESIN | = | ^B0100; |
| WRITEFST | = | ^B0101; |
| FSTBURST | = | ^B0110; |
| SNDBURST | = | ^B0111; |
| READSND | = | ^B1000; |
| READSIN | = | ^B1001; |
| READFST | = | ^B1010; |
| REFRESH | = | ^B1011; |
| MCLEAR | = | ^B1111; |

End of Command Definitions

EQUATIONS

```
EEREAD: = (C_REG==READEE) & (S_REG==SETA_a)
         # EEREAD & !EERCLR;

EERCLR: = (C_REG==READEE) & (S_REG==SETA_j)
         # (C_REG==MCLEAR)
         # (S_REG==idle);

WREPOD: = (C_REG==WRITEE) & (S_REG==SETA_b) & EEAD15
         # WREPOD & !ODECLR;

ODECLR: = (C_REG==WRITEE) & (S_REG==SETA_e)
         # (C_REG==MCLEAR)
         # (S_REG==idle);

WREPEV: = (C_REG==WRITEE) & (S_REG==SETA_b) & !EEAD15
         # WREPEV & !ODECLR;

EARENB1:= (C_REG==READEE) & (S_REG==SETA_a)
         # (C_REG==WRITEE) & (S_REG==SETA_a)
         # EARENB1 & !EARENCL;

EARENB2:= (C_REG==READEE) & (S_REG==SETA_a)
         # (C_REG==WRITEE) & (S_REG==SETA_a)
         # EARENB2 & !EARENCL;

EARENCL:= (C_REG==READEE) & (S_REG==SETA_j)
         # (C_REG==MCLEAR)
         # (S_REG==idle);
```

VI. <u>Burst Register Controller Circuit 12-660f</u>
<u>MODULE XCM51</u>

<u>Pin Specifications:</u>
    (Inputs)
```
REFCLK       PIN  1;
BURSTA1      PIN  2;
```

| | | |
|---|---|---|
| BURSTA2 | PIN | 3; |
| XSMCSA | PIN | 4; |
| XSMCSB | PIN | 5; |
| XSMCSC | PIN | 6; |
| XSMCSD | PIN | 7; |
| XSMCSE | PIN | 8; |
| XSMCCA | PIN | 9; |
| XSMCCB | PIN | 10; |
| XSMCCC | PIN | 11; |
| XSMCCD | PIN | 13; |

(Outputs)

| | | |
|---|---|---|
| !XT3DTLR | PIN | 15; |
| !XT2DTLR | PIN | 16; |
| !XT1DTLR | PIN | 17; |
| !XT0DTLR | PIN | 18; |
| !XT3DTLL | PIN | 19; |
| !XT2DTLL | PIN | 20; |
| !XT1DTLL | PIN | 21; |
| !XT0DTLL | PIN | 22; |
| XSMSASK | PIN | 23; |

EQUATES

S_REG = [XSMCSA,XSMCSB,XSMCSC,XSMCSD,XSMCSE];
C_REG = [XSMCCA,XSMCCB,XSMCCC,XSMCCD];

State Machine State Definitions

| | | |
|---|---|---|
| idle | = | ^B00000; |
| stall | = | ^B00001; |
| SETA_a | = | ^B00010; |
| SETA_b | = | ^B00011; |
| SETA_c | = | ^B00100; |
| SETA_d | = | ^B00101; |
| SETA_e | = | ^B00110; |
| SETA_f | = | ^B00111; |

| | | |
|---|---|---|
| SETA_g | = | ^B01000; |
| SETA_h | = | ^B01001; |
| SETA_i | = | ^B01010; |
| SETA_j | = | ^B01011; |
| SETA_k | = | ^B01100; |
| SETA_l | = | ^B01101; |
| SETA_m | = | ^B01110; |
| close | = | ^B01111; |
| SETB_a | = | ^B10000; |
| SETB_b | = | ^B10100; |
| SETB_c | = | ^B11000; |
| SETB_d | = | ^B11100; |

End of State Machine State Definitions

State Machine Command Definitions

| | | |
|---|---|---|
| NOP | = | ^B0000; |
| READEE | = | ^B0001; |
| WRITEE | = | ^B0010; |
| WRITESND | = | ^B0011; |
| WRITESIN | = | ^B0100; |
| WRITEFST | = | ^B0101; |
| FSTBURST | = | ^B0110; |
| SNDBURST | = | ^B0111; |
| READSND | = | ^B1000; |
| READSIN | = | ^B1001; |
| READFST | = | ^B1010; |
| REFRESH | = | ^B1011; |
| MCLEAR | = | ^B1111; |

End of Command Definitions

EQUATIONS

XSMSASK : = (C_REG==READEE) & (S_REG==SETA_e)
         # (C_REG==SNDBURST) & (S_REG==SETA_d)

```
        # (C_REG==FSTBURST) & (S_REG==SETA_d)
        # (C_REG==READSND) & (S_REG==SETA_a)
        # (C_REG==READSIN) & (S_REG==SETA_a);

XT0DTLL : = (C_REG==READEE) & (S_REG==SETA_h)
        # (C_REG==SNDBURST) & (S_REG==SETA_d)
        # (C_REG==FSTBURST) & (S_REG==SETA_d)
        # (C_REG==READSIN) & (S_REG==SETA_d) &
            !BURSTA1 & !BURSTA2
        # (C_REG==READFST) & (S_REG==SETA_d);

XT1DTLL : = (C_REG==READEE) & (S_REG==SETA_h)
        # (C_REG==SNDBURST) & (S_REG==SETA_e)
        # (C_REG==FSTBURST) & (S_REG==SETA_e)
        # (C_REG==READSIN) & (S_REG==SETA_d) &
            !BURSTA1 & BURSTA2
        # (C_REG==READFST) & (S_REG==SETA_d);

XT2DTLL : = (C_REG==READEE) & (S_REG==SETA_h)
        # (C_REG==SNDBURST) & (S_REG==SETA_f)
        # (C_REG==FSTBURST) & (S_REG==SETA_f)
        # (C_REG==READSIN) & (S_REG==SETA_d) &
            BURSTA1 & !BURSTA2
        # (C_REG==READFST) & (S_REG==SETA_d);

XT3DTLL : = (C_REG==READEE) & (S_REG==SETA_h)
        # (C_REG==SNDBURST) & (S_REG==SETA_g)
        # (C_REG==FSTBURST) & (S_REG==SETA_g)
        # (C_REG==READSIN) & (S_REG==SETA_d) &
            BURSTA1 & BURSTA2
        # (C_REG==READFST) & (S_REG==SETA_d);

XT0DTLR : = (C_REG==READEE) & (S_REG==SETA_h)
        # (C_REG==SNDBURST) & (S_REG==SETA_d)
        # (C_REG==FSTBURST) & (S_REG==SETA_d)
        # (C_REG==READSIN) & (S_REG==SETA_d) &
            !BURSTA1 & !BURSTA2
        # (C_REG==READSND) & (S_REG==SETA_d);
```

```
XT1DTLR : = (C_REG==READEE) & (S_REG==SETA_h)
          # (C_REG==SNDBURST) & (S_REG==SETA_e)
          # (C_REG==FSTBURST) & (S_REG==SETA_e)
          # (C_REG==READSND) & (S_REG==SETA_d)
          # (C_REG==READSIN) & (S_REG==SETA_d) &
               !BURSTA1 & BURSTA2;

XT2DTLR : = (C_REG==READEE) & (S_REG==SETA_h)
          # (C_REG==SNDBURST) & (S_REG==SETA_f)
          # (C_REG==FSTBURST) & (S_REG==SETA_f)
          # (C_REG==READSIN) & (S_REG==SETA_d) &
               BURSTA1 & !BURSTA2
          # (C_REG=READSND) & (S_REG==SETA_d);

XT3DTLR : = (C_REG===READEE) & (S_REG==SETA_h)
          # (C_REG==SNDBURST) & (S_REG==SETA_g)
          # (C_REG==FSTBURST) & (S_REG==SETA_g)
          # (C_REG==READSND) & (S_REG==SETA_d)
          # (C_REG==READSIN) & (S_REG==SETA_d) &
               BURSTA1 & BURSTA2;
```

VII. Burst Address Counter Circuit 12-660g
MODULE XCM63

Pin Specifications:

(Inputs)

| | |
|---|---|
| REFCLK | PIN 1; |
| RXHAVED | PIN 2; |
| RXHAVE | PIN 3; |
| !XTR1LD | PIN 4; |
| !XTR2LD | PIN 5; |
| RXACKR | PIN 6; |
| RXANYR | PIN 7; |
| RXXTWON | PIN 8; |
| X1NEXT | PIN 9; |
| RXAD19 | PIN 10; |

```
RXAD20          PIN 11;
RXAD21          PIN 13;

(Outputs)

BURSTA0_X1      PIN 19;
BURSTA0_X2      PIN 18;
BURSTA1_X1      PIN 17;
BURSTA1_X2      PIN 16;
BURSTA2_X1      PIN 15;
BURSTA2_X2      PIN 14;

EQUATIONS
BURSTA0_X1 : =  RXHAVED & XTR1LD & RXAD19 #
                X1NEXT & RXHAVE & !RXHAVED & RXACKR &
                RXANYR & RXXTWON & !BURSTA0_X1 & BURSTA1_X1
                & BURSTA2__X1 # BURSTA0_X1 & !((RXHAVED &
                XTR1LD & !RXAD19) # (X1NEXT & RXHAVE &
                !RXHAVED & RXACKR & RXANYR & RXXTWON &
                BURSTA1_X1 & BURSTA2_X1));

BURSTA1_X1 : =  RXHAVED & XTR1LD & RXAD20 #
                X1NEXT & RXHAVE & !RXHAVE & !RXHAVED &
                RXACKR & RXANYR & RXXTWON &
                !BURSTA1_X1 & BURSTA2_X1 #
                BURSTA1__X1 & !((RXHAVED & XTR1LD & !RXAD20)
                # (X1NEXT & RXHAVE & !RXHAVED & RXACKR &
                RXANYR & RXXTWON & BURSTA2_X1));

BURSTA2_X1 : =  RXHAVED & XTR1LD & RXAD21 #
                X1NEXT & RXHAVE & !RXHAVED & RXACKR &
                RXANYR & RXXTWON & !BURSTA2_X1 #
                BURSTA2__X1 & !((RXHAVED & XTR1LD & !RXAD21)
                # (X1NEXT & RXHAVE & !RXHAVED & RXACKR &
                RXANYR & RXXTWON & BURSTA2_X1));
```

```
BURSTA0_X2 : =    RXHAVED & XTR2LD & RXAD19 #
                  !X1NEXT & RXHAVE & !RXHAVED & RXACKR &
                  RXANYR & RXXTWON & !BURSTA0_X2 & BURSTA1_X2
                  & BURSTA2__X2 # BURSTA0_X2 & !((RXHAVED &
                  XTR2LD & !RXAD19) # (!X1NEXT & RXHAVE &
                  !RXHAVED & RXACKR & RXANYR & RXXTWON &
                  BURSTA1_X2 & BURSTA2_X2));

BURSTA1_X2 : =    RXHAVED 7 XTR2LD & RXAD20 #
                  !X1NEXT & RXHAVE & !RXHAVED & RXACKR &
                  RXANYR & RXXTWON & !BURSTA1_X2 & BURSTA2_X2
                  # BURSTA1__X2 & !((RXHAVED & XTR2LD &
                  !RXAD20) # (!X1NEXT & RXHAVE & !RXHAVED &
                  RXACKR & RXANYR & RXXTWON & BURSTA2_X2));

BURSTA2_X2 : =    RXHAVED & XTR2LD & RXAD21 #
                  !X1NEXT & RXHAVE & !RXHAVED & RXACKR &
                  RXANYR & RXXTWON & !BURSTA2_X2 # BURSTA2_X2
                  & !((RXHAVED & XTR2LD & !RXAD21) # (!X1NEXT
                  & RXHAVE & !RXHAVED & RXACKR & RXANYR &
                  RXXTWON & BURSTA2_X2));
```

VIII. State Control Register Generator Circuit 12-660h

MODULE XCM52

Pin Specifications:

(Inputs)

```
REFCLK      PIN  1;
XBLOCK      PIN  2;
XBSHBC      PIN  3;
XSMCSA      PIN  4;
XSMCSB      PIN  5;
XSMCSC      PIN  6;
XSMCSD      PIN  7;
```

| | | |
|---|---|---|
| XSMCSE | PIN | 8; |
| XSMCCA | PIN | 9; |
| XSMCCB | PIN | 10; |
| XSMCCC | PIN | 11; |
| XSMCCD | PIN | 13; |

(Outputs)

| | | |
|---|---|---|
| REFRCLR | PIN | 16; |
| !QBBLAST | PIN | 17; |
| XTRCLR | PIN | 18; |
| HOLDCLR | PIN | 19; |
| BLSTCLR | PIN | 20; |
| LOCKHOLD | PIN | 21; |
| LKHLDCL | PIN | 23; |

EQUATES

S_REG = [XSMCSA,XSMCSB,XSMCSC,XSMCSD,XSMCSE];
C_REG = [XSMCCA,XSMCCB,XSMCCC,XSMCCD];

State Machine State Definitions

```
idle    =   ^B00000;
stall   =   ^B00001;
SETA_a  =   ^B00010;
SETA_b  =   ^B00011;
SETA_c  =   ^B00100;
SETA_d  =   ^B00101;
SETA_e  =   ^B00110;
SETA_f  =   ^B00111;
SETA_g  =   ^B01000;
SETA_h  =   ^B01001;
SETA_i  =   ^B01010;
SETA_j  =   ^B01011;
SETA_k  =   ^B01100;
SETA_l  =   ^B01101;
SETA_m  =   ^B01110;
```

```
close     =    ^B01111;
SETB_a    =    ^B10000;
SETB_b    =    ^B10100;
SETB_c    =    ^B11000;
SETB_d    =    ^B11100;
```

End of State Machine State Definitions

State Machine Command Definitions

```
NOP        =    ^B0000;
READEE     =    ^B0001;
WRITEE     =    ^B0010;
WRITESND   =    ^B0011;
WRITESIN   =    ^B0100;
WRITEFST   =    ^B0101;
FSTBURST   =    ^B0110;
SNDBURST   =    ^B0111;
READSND    =    ^B1000;
READSIN    =    ^B1001;
READFST    =    ^B1010;
REFRESH    =    ^B1011;
MCLEAR     =    ^B1111;
```

End of Command Definitions

EQUATIONS

```
XTRCLR:=       (C_REG==READEE) & (S_REG==SETA_k)
           #   (C_REG==WRITEE) & (S_REG==SETA_e)
           #   (C_REG==WRITESND) & (S_REG==SETA_b)
           #   (C_REG==WRITESIN) & (S_REG==SETA_b)
           #   (C_REG==SNDBURST) & (S_REG==SETA_k)
           #   (C_REG==READSND) & (S_REG==SETA_k)
           #   (C_REG==READSIN) & (S_REG==SETA_k);

HOLDCLR:=      (C_REG==READEE) & (S_REG==SETA_f)
           #   (C_REG==WRITEE) & (S_REG==SETA_c)
```

```
            # (C_REG==WRITESND) & (S_REG==SETA_d)
            # (C_REG==WRITESIN) & (S_REG==SETA_d)
            # (C_REG==WRITEFST) & (S_REG==SETA_b)
            # (C_REG==SNDBURST) & (S_REG==SETA_f)
            # (C_REG==FSTBURST) & (S_REG==SETA_f)
            # (C_REG==READSND) & (S_REG==SETA_c)
            # (C_REG==READSIN) & (S_REG==SETA_c)
            # (C_REG==READFST) & (S_REG==SETA_c)
            # (C_REG==REFRESH) & (S_REG==SETA_b)
            # (C_REG==MCLEAR)
            # (S_REG==SETB_b);

BLSTCLR:=     (C_REG==READSND) & (S_REG==SETA_c)
            # (C_REG==READSIN) & (S_REG==SETA_c)
            # (C_REG==READFST) & (S_REG==SETA_c)
            # (C_REG==MCLEAR);

QBBLAST:=   (C_REG==READSND) & (S_REG==SETA_a) &
              !BLSTCLR
            # (C_REG==READSIN) & (S_REG==SETA_a) &
              !BLSTCLR
            # (C_REG==READFST) & (S_REG==SETA_a) &
              !BLSTCLR
            # QBBLAST & !BLSTCLR;

REFRCLR:=   (C_REG==REFRESH) & (S_REG==SETA_a)
            # (S_REG==SETB_a)
            # (C_REG==MCLEAR);

LOCKHOLD:= !LKHLDCL & (C_REG==READSIN) & (S_REG==SETA_a)
              & XBLOCK & !XBSHBC
            # LOCKHOLD & !LKHLDCL;

LKHLDCL:=   (C_REG==WRITESIN) & (S_REG==SETA_a)
              & XBLOCK & XBSHBC
            # (C_REG==READSIN) & (S_REG==SETA_a)
              & XBLOCK & XBSHBC
            # (C_REG==MCLEAR);
```

IX. XTR1 & XTR2 Busy Generator Circuit 12-660i
MODULE XCM08

This PAL controls the loading of the XTR transaction queue.

Pin Specifications:

(Inputs)

| | | |
|---|---|---|
| REFCLK | PIN | 1; |
| RXHAVE | PIN | 2; |
| MBMCLR | PIN | 3; |
| XTR1BSYM | PIN | 4; |
| XTR2BSYM | PIN | 5; |
| XTRCLR | PIN | 6; |
| RXMEMA | PIN | 7; |
| RXCNCL | PIN | 8; |
| RXIORWA | PIN | 9; |
| RXEERW | PIN | 10; |
| "REFCLK | PIN | 11; for proper loading |

(Outputs)

| | | |
|---|---|---|
| XTR1BSY | PIN | 23; |
| XTR2BSY | PIN | 22; |
| X1NEXT | PIN | 21; |
| !XTR1LD | PIN | 20; |
| !XTR2LD | PIN | 19; |

EQUATES:

```
XTR1BSY := !MBMCLR & RXHAVE & !XTR1BSYM &
            (RXMEMA & !RXCNCL #        "MEMORY ACK
             RXIORWA & RXEERW) #       "EEPROM R/W ACK
          XTR1BSY & !(MBMCLR # XTRCLR & X1NEXT);
                                       "BUSY UNTIL
                                        SERVICED
```

```
XTR2BSY := !MBMCLR & RXHAVE & XTR1BSYM &
            (RXMEMA & !RXCNCL #           "MEMORY ACK Q1 B
      RXIORWA & RXEERW) #   "EEPROM R/W ACK Q1 ACK
       XTR2BSY & !(MBMCLR # XTRCLR & !X1NEXT);

X1NEXT : = !MBMCLR & RXHAVE & !XTR1BSYM & !XTR2BSYM &
            (RXMEMA 7 !RXCNCL # RXIORWA & RXEERW) #
       !MBMCLR & XTRCLR & !X1NEXT #
       X1NEXT & !(XTRCLR # MBMCLR);

XTR1LD : = !MBMCLR & RXHAVE & !XTR1BSYM & (RXMEMA &
            !RXCNCL # RXIORWA & RXEERW);

XTR2LD : = !MBMCLR & RXHAVE & XTR1BSYM & (RXMEMA &
            !RXCNCL # RXIORWA & RXEERW);
```

X. Backoff and Hold Generator Circuit 12-660j
MODULE XCM09

This PAL generates hold and backoff.

Pin Specifications:
(Inputs)

```
REFCLK    PIN  1;
RXHAVE    PIN  2;
XINIDLE   PIN  3;
XTR1BSY   PIN  4;
XTR2BSY   PIN  5;
RXMEMA    PIN  6;
RXCNCL    PIN  7;
RXIORWA   PIN. 8;
RXEERW    PIN  9;
REFREQT   PIN 10;
XINSTALL  PIN 11;
XSMCOVR   PIN 13;
HOLDCLR   PIN 14;
```

```
MBMCLR      PIN 15;
MBBOFFA     PIN 16;
PF_INT      PIN 23;

(Outputs)

QBBOFFD     PIN 21;
!QBBOFF1    PIN 20;
!QBBOFF0    PIN 19;
QBHOLD      PIN 18;

EQUATES:

EQUATIONS

QBHOLD  := RXHAVE & XINIDLE & !XTR1BSY & !XTR2BSY &
           (RXMEMA & !RXCNCL # RXIORWA & RXEERW) #
            "MEMORY OR EEPROM CYCLE
           XINIDLE & REFREQT #
           XINIDLE & XTR1BSY #
           XINIDLE & XTR2BSY #
           XINSTALL & REFREQT & !XSMCOVR #
           PF_INT #
           QBHOLD & !(HOLDCLR # MBMCLR);

QBBOFF1 := MBBOFFA & ((RXHAVE & XINIDLE & !XTR1BSY &
           !XTR2BSY & (RXMEMA & !RXCNCL # RXIORWA &
           RXEERW)) #
           XINIDLE & XTR1BSY #
           XINIDLE & XTR2BSY #
           XINIDLE & REFREQT #
           XINSTALL & REFREQT & !XSMCOVR) #
           QBBOFF1 & !(HOLDCLR # MBMCLR);

QBBOFF0 := MBBOFFA & ((RXHAVE & XINIDLE & !XTR1BSY &
           XTR2BSY & (RXMEMA & !RXCNCL # RXIORWA &
           RXEERW)) #
```

```
    XINIDLE & XTR1BSY #
    XINIDLE & XTR2BSY #
    XINIDLE & REFREQT #
    XINSTALL & REFREQT & !XSMCOVR) #
    QBBOFF0 & !(HOLDCLR # MBMCLR);

QBBOFFD := QBBOFF1;
```

XI. Refresh State and Address Enables Machine Circuit 12-660k

MODULE XCM47

Pin Specifications:

(Inputs)

| | | |
|---|---|---|
| REFCLK | PIN | 1; |
| FIRST | PIN | 2; |
| REFREQT | PIN | 3; |
| QBOFFD | PIN | 4; |
| !HOTHLDA | PIN | 5; |
| QBHOLD | PIN | 6; |
| X1NEXT | PIN | 7; |
| XINIDLE | PIN | 8; |
| XINSTAL | PIN | 9; |
| XSMCOVR | PIN | 10; |

(Outputs)

| | | |
|---|---|---|
| !X2ADE1 | PIN | 15; |
| !X2ADE0 | PIN | 16; |
| !X2ADEN | PIN | 17; |
| !X1ADE1 | PIN | 18; |
| !X1ADE0 | PIN | 19; |
| !X1ADEN | PIN | 20; |
| REFRESH | PIN | 22; |

EQUATIONS

X1ADEN: = X1NEXT;
X1ADE0: = X1NEXT & !FIRST;
X1ADE1: = X1NEXT & FIRST;
X2ADEN: = !X1NEXT;
X2ADE0: = !X1NEXT & !FIRST;
X2ADE1: = !X1NEXT & FIRST;
REFRESH: = XINIDLE & (QBOFFD # HOTHLDA & QBHOLD) &
       REFREQT # (XINSTAL & (QBOFFD # HOTHLDA & QBHOLD) & REFREQT;

B. EQUATIONS FOR SYSTEM BUS COMMAND PREDECODING

1. XBEEPROM = RXEERW+ = E2RWFC+ = (XTR COMMAND REGISTER BIT)
   !BSMREF & ((FCODE = H2D) # (FCODE = H28)).

2. XBWRIT+ = XBWRIT+X1 # XBWRIT+X2 = RXWRIT = (XTR COMMAND REGISTER BIT)
   BSWRIT RXCMDIN REGISTER.

3. XBDWODD+ = RXDWOOD+ = RXDBWD & RXDBPL & RXAD22 & XTR COMMAND REGISTER BIT !(RXAD19+ & RXAD20+ & RXAD21)
   where RXDBWD+ = BSDBWD+; RXDBPL = BSDBPL+; and RXAD19+ through RXAD22+ = BSAD19+ through BSAD22+.

4. XBBURST = XBBURST+X1 + XBBURST+X2 = RXBURST+ = BURST = (!RXWRIT & RXDBWD & !RXDBPL)
   where RXWRIT = BSWRIT; RXDBWD = BSDBWD+ and RXDBPL+ = BSDBPL+.

C. EQUATIONS FOR WRITE MASK GENERATION

1. RXBE00 = !RXWRIT & ( RXDBWD & !RXDBPL # !RXAD22) #
   RXWRIT & (!RXDBWD & !RXDBPL & !RXBYTE &
   !RXAD22 #

```
        !RXDBWD &  !RXDBPL &   RXBYTE &
        !RXAD22 &  !RXAD23 #
         RXDBWD &   RXDBPL &  !RXBYTE &
        !RXAD22 #
         RXDBWD &  !RXDBPL &  !RXBYTE &
        !RXAD22);

2.  RXBE01 = !RXWRIT & ( RXDBWD & !RXDBPL # !RXAD22) #
            RXWRIT & (!RXDBWD & !RXDBPL & !RXBYTE &
        !RXAD22 #
        !RXDBWD &  !RXDBPL &   RXBYTE &
        !RXAD22 & RXAD23 #
         RXDBWD &   RXDBPL &  !RXBYTE &
        !RXAD22 #
         RXDBWD &  !RXDBPL &   RXBYTE &
        !RXAD22 #
         RXDBWD &  !RXDBPL &  !RXBYTE &
        !RXAD22 #
         RXDBWD &   RXDBPL &   RXBYTE &
        !RXAD22);

3.  RXBE02 = !RXWRIT & (RXDBWD # RXAD22) #
            RXWRIT & (!RXDBWD & !RXDBPL & !RXBYTE &
         RXAD22 #
        !RXDBWD &  !RXDBPL &   RXBYTE &
         RXAD22 & !RXAD23 #
         RXDBWD &   RXDBPL &  !RXBYTE #
         RXDBWD &  !RXDBPL &   RXBYTE &
        !RXAD22 #
         RXDBWD &  !RXDBPL &  !RXBYTE #
         RXDBWD &   RXDBPL &   RXBYTE &
        !RXAD22);

4.  RXBE03 = !RXWRIT & (RXDBWD # RXAD22) #
            RXWRIT & (!RXDBWD & !RXDBPL & !RXBYTE &
         RXAD22 #
        !RXDBWD &  !RXDBPL &   RXBYTE &
```

RXAD22 & RXAD23 #
RXDBWD & RXDBPL & !RXBYTE #
RXDBWD & !RXDBPL & RXBYTE & RXAD22 #
RXDBWD & !RXDBPL & !RXBYTE & RXAD22 #
RXDBWD & RXDBPL & RXBYTE);

D. PAL CIRCUIT DESCRIPTIONS AND EQUATIONS FOR ADDRESS INCREMENTING CIRCUITS

MODULE XCM22

Pin Specifications:

(Inputs)

| | | |
|---|---|---|
| RXAD19_I | PIN | 2; |
| RXAD20_I | PIN | 3; |
| RXAD21_I | PIN | 4; |
| MSIZE0 | PIN | 5; |
| MSIZE1 | PIN | 6; |
| RXAD0G_I | PIN | 7; |
| RXAD0H_I | PIN | 8; |
| RXDBWD | PIN | 9; |
| RXDBPL | PIN | 10; |
| RXAD22 | PIN | 11; |
| RXWRIT | PIN | 13; |

(Outputs)

| | | |
|---|---|---|
| INCAD19 | PIN | 23; |
| INCAD20 | PIN | 22; |
| INCAD21 | PIN | 21; |
| RXBURST | PIN | 20; |
| RXDWODD | PIN | 19; |
| RXAD0G_O | PIN | 18; |
| RXAD0H_O | PIN | 17; |
| RXAD19_O | PIN | 16; |
| RXAD20_O | PIN | 15; |
| RXAD21_O | PIN | 14; |

EQUATES:

BURST MACRO {(!RXWRIT & RXDBWD & !RXDBPL)}
DW_RD MACRO {(RXDBWD & RXDBPL)}

MSIZE = [MSIZE0,MSIZE1];

EQUATIONS

RXBURST = BURST;
RXDWODD = RXDBWD & RXDBPL & RXAD22 & !(RXAD21_I &
          RXAD20_I & RXAD19_I);

RXADOG_O =   RXADOG_I & (MSIZE >= 2);
RXADOH_O =   RXADOG_I & (MSIZE >= 1);

RXAD19_O =   RXAD19_I;
RXAD20_O =   RXAD20_I & !BURST;
RXAD21_O =   RXAD21_I & !BURST;

INCAD19 = BURST #
          !RXWRIT & DW_RD & (!RXAD19_I & RXAD20_I &
          RXAD21_I # RXAD19_I);

INCAD20 = !RXWRIT & DW_RD & (!RXAD20_I & RXAD21_I #
          RXAD20_I & !RXAD21_I) #
           RXWRIT & (!RXAD20_I & RXAD21_I # RXAD20_I &
           !RXAD21_I);

INCAD21 = !RXWRIT & DW_RD & !RXAD21_I #
          RXWRIT & !RXAD21_I;

MODULE XCM23

Pin Specifications:
     (Inputs)

RXWRIT    PIN 2;

```
RXDBWD      PIN 3;
RXDBPL      PIN 4;
RXBYTE      PIN 5;
RXAD22      PIN 6;
RXAD23      PIN 7;
RXMREF      PIN 8;
RXSHBC      PIN 9;

(Outputs)

!RXBE00     PIN 23;
!RXBE01     PIN 22;
!RXBE02     PIN 21;
!RXBE03     PIN 20;
!INCBE00    PIN 19;
!INCBE01    PIN 18;
!INCBE02    PIN 17;
!INCBE03    PIN 16;
 RXSWAP     PIN 15;
 RXTWIN     PIN 14;

EQUATES:

EQUATIONS

RXBE03   =  !RXWRIT & (RXDBWD & RXAD22) #
             RXWRIT & (!RXDBWD & !RXDBPL & !RXBYTE &
             RXAD22 #
            !RXDBWD & !RXDBPL & RXBYTE & RXAD22 &
                RXAD23 #
             RXDBWD & RXDBPL & !RXBYTE #
             RXDBWD & !RXDBPL & RXBYTE & RXAD22 #
             RXDBWD & !RXDBPL & !RXBYTE & RXAD22 #
             RXDBWD & RXDBPL & RXBYTE);

RXBE02   =  !RXWRIT & (RXDBWD # RXAD22) #
             RXWRIT & (!RXDBWD & !RXDBPL & !RXBYTE &
```

```
                     RXAD22 #
                !RXDBWD & !RXDBPL & RXBYTE &
                    RXAD22 & !RXAD23 #
                RXDBWD & RXDBPL & !RXBYTE #
                RXDBWD & !RXDBPL & RXBYTE &
                    !RXAD22 #
                RXDBWD & !RXDBPL & !RXBYTE #
                RXDBWD & RXDBPL & RXBYTE &
                    !RXAD22);

RXBE01  =   !RXWRIT & (RXDBWD & !RXDBPL # !RXAD22) #
            RXWRIT & (!RXDBWD & !RXDBPL & !RXBYTE &
                !RXAD22 #
                !RXDBWD & !RXDBPL & RXBYTE &
                !RXAD22 & RXAD23 #
                RXDBWD & RXDBPL & !RXBYTE &
                !RXAD22 #
                RXDBWD & !RXDBPL & RXBYTE &
                !RXAD22 #
                RXDBWD & !RXDBPL & !RXBYTE &
                !RXAD22 #
                RXDBWD & RXDBPL & RXBYTE &
                !RXAD22);

RXBE00  =   !RXWRIT & (RXDBWD & !RXDBPL # !RXAD22) #
            RXWRIT & (!RXDBWD & RXDBPL & !RXBYTE &
                !RXAD22 #
                !RXDBWD & !RXDBPL & RXBYTE &
                !RXAD22 & !RXAD23 #
                RXDBWD & RXDBPL & !RXBYTE &
                !RXAD22 #
                RXDBWD & !RXDBPL & !RXBYTE &
                !RXAD22);

INCBE03 =   !RXWRIT 7 (RXDBWD & !RXDBPL);

INCBE02 =   !RXWRIT & (RXDBWD & !RXDBPL);

INCBE01 =   !RXWRIT & (RXDBWD & !RXDBPL # RXDBWD & RXDBPL
```

```
                    & RXAD22) #
          RXWRIT & (RXDBWD & RXDBPL & !RXBYTE &
                    RXAD22 #
                    RXDBWD & RXDBPL & RXBYTE &
                    RXAD22);

INCBE00 =  !RXWRIT & (RXDBWD & !RXDBPL # RXDBWD &
                    RXDBPL & RXAD22) #
          RXWRIT & (RXDBWD &  RXDBPL & !RXBYTE &
                    RXAD22 #
                    RXDBWD & !RXDBPL & RXBYTE &
                    RXAD22 #
                    RXDBWD &  RXDBPL & !RXBYTE &
                    RXAD22 #
                    RXDBWD & RXDBPL & RXBYTE &
                    RXAD22);

RXSWAP  =  RXMREF & RXDBWD & RXAD22;

RXTWIN  =  RXMREF  &  !RXDBWD  #  !RXMREF  &  !RXSHBC  #
          !RXMREF & RXSHBC & !RXDBWD;
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A processing unit tightly coupled to a system bus which utilizes a split cycle bus protocol for processing read and write memory requests, said processing unit comprising:

a local memory;

a synchronous bus tightly coupled to said local memory for enabling access to said local memory using a predetermined bus protocol different from said split cycle bus protocol; and, a state machine coupled to said synchronous bus and to said system bus, said state machine for processing a plurality of different types of complex commands received from said system bus and including:

a plurality of synchronously operated programmable array logic (PAL) circuits, a first one of said PAL circuits being coupled to said system bus for decoding each of said different types of complex commands received from said system bus to generate a state code designating the command type;

a second one of said PAL circuits coupled to said first one of said PAL circuits and to said synchronous bus for generating a start signal upon receipt of synchronous bus signals indicating that said state machine has gained control of said synchronous bus according to said predetermined bus protocol;

a third one of said PAL circuits coupled to said first and second ones of said PAL circuits, said third one of said PALS being preprogrammed for generating signals representative of a plurality of sequential states corresponding to a number of different basic sequences required for executing said different types of complex commands within a preestablished number of clock cycles which emulates said predetermined bus protocol of said synchronous bus; and a fourth one of said PAL circuits coupled to said first and third ones of said PAL circuits for receiving said state code and sequential state signals representative of said plurality of sequential states, said fourth one of said PAL circuits in response to said state code and said sequential state signals, generating stop and stall control signals indicating completion or temporary interruption of a number of said basic sequences required for processing each of said complex commands, said third one of said plurality of PAL circuits in response to said stop and stall signals respectively sequencing to an idle state to await receipt of a next complex command from said system bus and sequencing to a stall state to await receipt of a signal from said system bus indicating completion of an operation according to said split cycle protocol.

2. The state machine of claim 1 wherein said state machine further includes a number of programmable array logic (PAL) circuits connected to said first and third PAL circuits, each of said PAL circuits in response to said state code and said sequential state signals generating output signals for completing different types of read and write operations.

3. The state machine of claim 1 wherein said second PAL circuit in response to said synchronous bus signals generates predetermined synchronous bus protocol signals for initiating a transfer of address and command signals of said external requests to said synchronous bus.

4. The state machine of claim 1 wherein said processing unit further includes a memory array which couples to said synchronous bus and to said system bus making said memory array accessible by input and output requests received from said system bus and wherein a fifth one of said plurality of PAL circuits in response to said state code and sequence state signals generates read and write command signals for performing operations on said memory array in response to said input and output requests.

5. The state machine of claim 1 wherein said fourth PAL circuit is programmed to set a first sequence completed signal for enabling execution of another basic state sequence on said synchronous bus for completing predetermined ones of said complex commands received from said system bus whose execution can be performed by a plurality of said basic state sequences.

6. The state machine of claim 1 wherein said processing unit further includes a clock and timer generator for generating a clock reference signal used for synchronizing operations within said state machine with said synchronous bus and a refresh request signal after a predetermined number of clock reference signals indicating a need to refresh said local memory and wherein a sixth PAL circuit couples to said third PAL circuit, to said synchronous bus, to said clock generator and to said system bus, said sixth PAL circuit in response to a refresh request from said clock generator and a signal from said third PAL circuit indicating that said state machine is in a stall state, generating another set of basic state sequences for each predetermined type of complex command for gaining control of said synchronous bus to perform a refresh cycle of operation and to return to said stall state for completing said number of basic state sequences for the complex command under execution ensuring that said local memory is properly refreshed notwithstanding the type of complex command being executed.

7. The state machine of claim 6 wherein said predetermined type of complex command corresponds to a read type of command.

8. The state machine of claim 1 wherein said third PAL circuit is programmed to enable sets of said number of basic state sequences to be executed for completing a plurality of said complex commands.

9. The state machine of claim 8 wherein said plurality of said complex commands include commands specifying writing method data into said local memory with different byte alignments.

10. The state machine of claim 9 wherein said commands include write double word odd byte aligned commands.

11. The state machine of claim 1 wherein said state machine includes a write address control PAL circuit coupled to said synchronous bus, said write address control PAL circuit for generating a plurality of byte write mask signals for selecting the proper bytes to be written into said local memory for converting said complex system bus command into a form which is consistent with said bus protocol.

12. The state machine of claim 8 wherein said plurality of said complex commands include commands specifying reading multiple words of memory data from said local memory.

13. The state machine of claim 9 wherein said commands include burst read commands.

14. The state machine of claim 13 wherein each of said burst read commands is broken into a plurality of transactions, each transaction being carried out by a similar sequence of states.

15. A method of transferring external commands received from a system bus, operating according to a complex protocol, to a memory unit which tightly couples to a synchronous bus, operating according to a different predetermined bus protocol, said method comprising the steps of:

connecting a state machine between said system bus and said synchronous bus, the state machine comprising a plurality of synchronously operated programmable array logic (PAL) circuits, said state machine receiving a plurality of different types of complex commands from said system bus;

programming said PAL circuits to contain a plurality of precoded state sequences which do not contain any branch operations for operating a high speed;

executing said plurality of precoded state sequences by said PAL circuits to perform the steps of:

decoding each of said different types of complex commands received from said system bus by state machine for determining which type of operation is specified to be performed by said each complex command and generating information indicative of each said decoded complex command;

generating a start command as soon as said state machine has been given access to said synchronous bus according to said predetermined bus protocol; and sequencing through a number of said plurality of said precoded sequences designated by said complex command in response to said start signal for generating control signals for transferring said information associated with said each complex command to said memory unit on said synchronous bus according to said predetermined protocol for enabling said memory unit to perform said operation specified by said each complex command.

* * * * *